(12) United States Patent
Hirabayashi et al.

(10) Patent No.: US 10,735,794 B2
(45) Date of Patent: Aug. 4, 2020

(54) INFORMATION PROCESSING DEVICE, INFORMATION PROCESSING METHOD, AND INFORMATION PROCESSING SYSTEM

(71) Applicant: SONY CORPORATION, Tokyo (JP)

(72) Inventors: Mitsuhiro Hirabayashi, Tokyo (JP); Toru Chinen, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 99 days.

(21) Appl. No.: 16/086,663

(22) PCT Filed: Mar. 14, 2017

(86) PCT No.: PCT/JP2017/010111
§ 371 (c)(1),
(2) Date: Sep. 20, 2018

(87) PCT Pub. No.: WO2017/169727
PCT Pub. Date: Oct. 5, 2017

(65) Prior Publication Data
US 2019/0104332 A1 Apr. 4, 2019

(30) Foreign Application Priority Data
Mar. 28, 2016 (JP) .................................. 2016-063224

(51) Int. Cl.
*H04N 21/2662* (2011.01)
*H04N 21/233* (2011.01)
(Continued)

(52) U.S. Cl.
CPC ....... *H04N 21/2662* (2013.01); *H04N 21/233* (2013.01); *H04N 21/23439* (2013.01);
(Continued)

(58) Field of Classification Search
CPC .................................................. H04N 21/2662
(Continued)

(56) References Cited

U.S. PATENT DOCUMENTS

2009/0287493 A1 11/2009 Janssen et al.
2011/0093605 A1 4/2011 Choudhury et al.
(Continued)

FOREIGN PATENT DOCUMENTS

CN 101189678 A 5/2008
CN 102577312 A 7/2012
(Continued)

OTHER PUBLICATIONS

International Search Report and Written Opinion of PCT Application No. PCT/JP2017/010111, dated Apr. 25, 2017, 20 pages of ISRWO.

(Continued)

*Primary Examiner* — Yulin Sun
(74) *Attorney, Agent, or Firm* — Chip Law Group

(57) ABSTRACT

The present disclosure relates to an information processing device, an information processing method, and an information processing system capable of appropriately performing scaling of a distribution device which distributes an audio stream encoded by a lossless compression system. An original distribution server performs scaling of a premium server which distributes the audio stream to a premium client on the basis of bit rate information including an average value of a predetermined period of bit rates of the audio stream encoded by a lossless DSD system. The present disclosure is applicable to, for example, the original distribution server or the like.

20 Claims, 26 Drawing Sheets

(51) Int. Cl.
- *H04N 21/2343* (2011.01)
- *H04N 21/81* (2011.01)
- *H04N 21/24* (2011.01)
- *H04N 21/262* (2011.01)
- *H04N 21/845* (2011.01)
- *G10L 19/00* (2013.01)

(52) U.S. Cl.
CPC ... *H04N 21/2407* (2013.01); *H04N 21/26225* (2013.01); *H04N 21/26258* (2013.01); *H04N 21/8106* (2013.01); *H04N 21/8456* (2013.01); *G10L 19/0017* (2013.01)

(58) Field of Classification Search
USPC ..................................................... 375/240.01
See application file for complete search history.

(56) References Cited

U.S. PATENT DOCUMENTS

| | | | |
|---|---|---|---|
| 2011/0099594 A1 | 4/2011 | Chen et al. | |
| 2013/0054756 A1* | 2/2013 | Do | H04N 21/23103 709/219 |
| 2014/0309039 A1* | 10/2014 | Yoshida | A63F 13/35 463/42 |
| 2015/0195328 A1 | 7/2015 | Rehan et al. | |

FOREIGN PATENT DOCUMENTS

| | | |
|---|---|---|
| CN | 102598688 A | 7/2012 |
| CN | 105393574 A | 3/2016 |
| EP | 1891639 A1 | 2/2008 |
| EP | 2489167 A1 | 8/2012 |
| EP | 2494779 A1 | 9/2012 |
| EP | 2615799 A1 | 7/2013 |
| EP | 3031229 A1 | 6/2016 |
| GB | 2477513 A | 8/2011 |
| GB | 2477642 A | 8/2011 |
| GB | 2477643 A | 8/2011 |
| JP | 2000-350164 A | 12/2000 |
| JP | 2008-546014 A | 12/2008 |
| JP | 2013-509040 A | 3/2013 |
| JP | 2013-509818 A | 3/2013 |
| JP | 2013-109547 A | 6/2013 |
| JP | 2016-534617 A | 11/2016 |
| KR | 10-2008-0017392 A | 2/2008 |
| KR | 10-2012-0083463 A | 7/2012 |
| KR | 10-2012-0085870 A | 8/2012 |
| KR | 10-2016-0033686 A | 3/2016 |
| WO | 2006/129215 A2 | 12/2006 |
| WO | 2011/047335 A1 | 4/2011 |
| WO | 2011/053658 A1 | 5/2011 |
| WO | 2011/094844 A1 | 8/2011 |
| WO | 2013/077034 A1 | 5/2013 |
| WO | 2015/021152 A1 | 2/2015 |

OTHER PUBLICATIONS

Fujioka, S. et al.: "A Study of Scale-Out System Configuration for a Streaming-Server", Proceedings of the 2015 IEICE General Conference, vol. 2, Feb. 24, 2015, ISSN: 1349-1369, pp. 109.

Hironobu Fukami, "Chapter 5: Scalable WordPress using AWS", Reader for training WordPress Professional, 1st edition, Nov. 15, 2014, ISBN:978-4-7741-6787-9, pp. 97-103.

Nikkei Computer, Oct. 15, 2001, ISSN: 0285-4619, pp. 36-41.

Nikkei Electronics, Jan. 15, 1996, ISSN: 0385-1680, pp. 67-75.

\* cited by examiner

FIG. 12

| | PREMIUM SERVICE | QUASI-PREMIUM SERVICE | ON-DEMAND SERVICE |
|---|---|---|---|
| SUPPOSED BANDWIDTH | MAXIMUM BIT RATE | BIT RATE DETERMINED ON THE BASIS OF BIT RATE INFORMATION FROM ACQUISITION START TIME UNTIL TIME AT WHICH DISTRIBUTION IS ALLOWED AND MAXIMUM BIT RATE | AVERAGE VALUE OF ACTUAL BIT RATES |
| DISTRIBUTING SERVER | GUARANTEE SUPPOSED BANDWIDTH | GUARANTEE SUPPOSED BANDWIDTH (BANDWIDTH CLOSER TO ACTUAL BIT RATE MAY BE GUARANTEED AS TIME FROM ACQUISITION START TIME TO TIME AT WHICH DISTRIBUTION IS ALLOWED IS LONGER) | GUARANTEE SUPPOSED BANDWIDTH |
| REPRODUCING CLIENT | CAPABLE OF REPRODUCING AUDIO STREAM OF SAME Bandwidth FROM REPRODUCTION START TIME TO REPRODUCTION FINISH TIME | IN CASE WHERE SUPPOSED BANDWIDTH IS NOT SUFFICIENTLY LARGER THAN AVERAGE VALUE, CHANGE TIME LENGTH OF AUDIO STREAM HELD IN BUFFER | CHANGE TIME LENGTH OF AUDIO STREAM TO BE HELD IN BUFFER OR CHANGE Bandwidth OF AUDIO STREAM |
| VALUE OF MOVING IMAGE CONTENT | HIGH | MEDIUM | LOW |
| DISTRIBUTION COST | HIGH | MEDIUM | LOW |
| ON-DEMAND SERVICE COMPATIBILITY | NO | NO | YES |
| ALLOWABLE NUMBER | SERVER DEPENDENCY SMALL | SERVER DEPENDENCY SMALL TO MEDIUM CLIENT DEPENDENCY MEDIUM TO LARGE | CLIENT DEPENDENCY LARGE |
| SERVICE FEE | HIGH | MEDIUM | LOW |

FIG. 14

```
aligned(8) class DASHEventMessageBox extends FullBox('emsg', version = 0,
flags =0){
    string scheme_id_uri = "urn:mpeg:dash:event:2012"
    string value = "1"
    unsigned int(32) timescale = "1"
    unsigned int(32) presentation_time_delta = "5"
    unsigned int(32) event_duration = "0xFFFF"
    unsigned int(32) id = "xxxx"
    unsigned int(8) message_data[ ] = "UPDATE TIME"
}
```

FIG. 16

```
aligned(8) class DASHEventMessageBox extends FullBox('emsg', version = 0,
flags =0){
  string scheme_id_uri = "urn:mpeg:dash:event:2012"
  string value = "2"
  unsigned int(32) timescale = "1"
  unsigned int(32) presentation_time_delta = "0"
  unsigned int(32) event_duration = "0xFFFF"
  unsigned int(32) id = "xxxx"
  unsigned int(8) message_data[ ] = "UPDATE INFORMATION OF MPD FILE"
```

FIG. 18

```
aligned(8) class DASHEventMessageBox extends FullBox('emsg', version = 0, flags =0) {
    string scheme_id_uri = "urn:mpeg:dash:event:2015"
    string value = "3"
    unsigned int(32) timescale = "1"
    unsigned int(32) presentation_time_delta = "0"
*/
    unsigned int(32) event_duration = "0xFFFF"
    unsigned int(32) id = "xxxx"
    unsigned int(8) message_data[ ]; "AveBandwidth AND DurationForAveBandwidth"
}
```

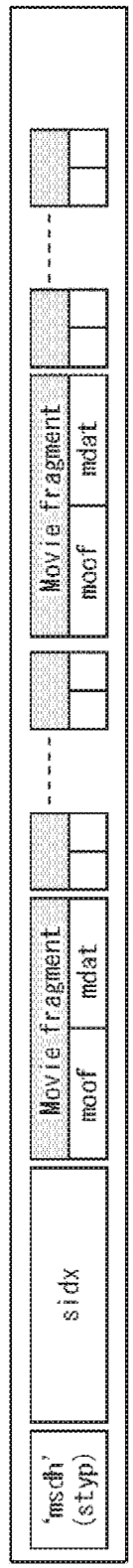
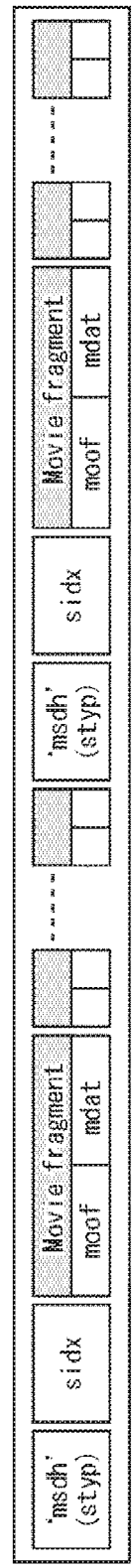
FIG. 22A
FIG. 22B

FIG. 24

```
pre_table[4096][16] =
{369a, 0, 0, 0, 0, 0, 0, 0, 0, 0, 0, 0, 0, 0, 0, 0},
{0, 0, 0, 0, 0, 0, 0, 0, 0, 0, 0, 0, 0, 0, 0, 0},
......
{0, 1, 10, 18, 20, 31, 11, 0, 4, 12, 5, 0, 0, 0, 0, 0},  ← 118TH ROW
...
```

FIG. 25

```
table1[4096][3] =
{00, ff, ff},
{ff, ff, ff},
......
{05, 04, 03},  ← 118TH ROW
...
```

INFORMATION PROCESSING DEVICE, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2017/010111 filed on Mar. 14, 2017, which claims priority benefit of Japanese Patent Application No. JP 2016-063224 filed in the Japan Patent Office on Mar. 28, 2016. Each of the above-referenced applications is hereby incorporated herein by reference in its entirety.

TECHNICAL FIELD

The present disclosure relates to an information processing device, an information processing method, and an information processing system, and especially relates to an information processing device, an information processing method, and an information processing system capable of appropriately performing scaling of a distribution device which distributes an audio stream encoded by a lossless compression system.

BACKGROUND ART

Recently, over the top video (OTT-V) is a mainstream of streaming services on the Internet. Moving Picture Experts Group phase-Dynamic Adaptive Streaming over HTTP (MPEG-DASH) starts becoming popular as base technology thereof (for example, refer to Non-Patent Document 1).

In MPEG-DASH, a server prepares a group of moving image data of different bit rates for one moving image content, and a client requests a group of moving image data of an optimum bit rate according to a situation of a network bandwidth, so that adaptive streaming distribution is realized.

Also, in current MPEG-DASH, an encoding system capable of predicting a bit rate in advance is assumed as an encoding system of the moving image content. Specifically, as the encoding system of an audio stream, an irreversible compression system and the like of encoding an audio digital signal analog/digital (A/D) converted by a pulse code modulation (PCM) system such that underflow or overflow does not occur with a fixed size buffer is assumed. Therefore, on the basis of a predicted bit rate, scaling is performed on the server which distributes the moving image content.

Also, in recent years, high-resolution audio of higher audio quality than au audio source of a compact disc (CD) attracts attention. As the A/D conversion system of the high resolution audio, there is a direct stream digital (DSD) system and the like. The DSD system is a system adopted as a recording and reproducing system of a super audio CD (SA-CD), and is a system on the basis of one-bit digital sigma modulation. Specifically, in the DSD system, information of the audio analog signal is expressed with density of change points of "1" and "0" using the time axis. Therefore, it is possible to realize high-resolution recording/reproduction independent of the number of bits.

However, in the DSD system, a pattern of "1" and "0" of the audio digital signal change according to a waveform of the audio analog signal. Therefore, a bit generation amount of the audio digital signal after encoding varies depending on the waveform of the audio analog signal in the lossless DSD system and the like in which lossless compression encoding is performed on the audio digital signal A/D converted by the DSD system on the basis of the pattern of "1" and "0". Therefore, it is difficult to predict the bit rate in advance.

CITATION LIST

Non-Patent Document

Non-Patent Document 1: MPEG-DASH (Dynamic Adaptive Streaming over HTTP) (URL:http://mpeg.chiariglione.org/standards/mpeg-dash/media-presentation-description-and-segment-formats/text-isoiec-23009-12012-dam-1)

SUMMARY OF THE INVENTION

Problems to be Solved by the Invention

As described above, in the current MPEG-DASH, it is difficult to appropriately perform the scaling of the distribution server which distributes the audio stream encoded by the lossless compression system such as the lossless DSD system of which bit rate cannot be predicted.

The present disclosure is achieved in view of the above circumstances, and an object thereof is to appropriately perform scaling of a distribution device which distributes an audio stream encoded by a lossless compression system.

Solutions to Problems

An information processing device according to a first aspect of the present disclosure is an information processing device provided with a scaling unit which performs scaling of a distribution device which distributes an audio stream to other information processing device on the basis of bit rate information including an average value of a predetermined period of bit rates of the audio stream encoded by a lossless compression system.

An image processing method according to the first aspect of the present disclosure corresponds to the image processing device according to the first aspect of the present disclosure.

In the first aspect of the present disclosure, scaling of a distribution device which distributes an audio stream to other information processing device is performed on the basis of bit rate information including an average value of a predetermined period of bit rates of the audio stream encoded by a lossless compression system.

An information processing system according to a second aspect of the present disclosure is an information processing system provided with a first information processing device, a second information processing device, and a distribution device, in which the first information processing device performs scaling of the distribution device which distributes an audio stream to the second information processing device on the basis of bit rate information including an average value of a predetermined period of bit rates of the audio stream encoded by a lossless compression system.

The second aspect of the present disclosure is provided with a first information processing device, a second information processing device, and a distribution device, in which the first information processing device performs scaling of the distribution device which distributes an audio stream to the second information processing device on the basis of bit rate information including an average value of a predetermined period of bit rates of the audio stream encoded by a lossless compression system.

Meanwhile, the image processing device according to the first aspect may be realized by allowing a computer to execute a program.

Also, in order to realize the image processing device according to the first aspect, the program to be executed by the computer may be provided by being transmitted via a transmission medium or by being recorded on a recording medium.

Effects of the Invention

According to the first and second aspects of the present disclosure, it is possible to appropriately perform the scaling of the distribution device which distributes the audio stream encoded by the lossless compression system.

Meanwhile, the effects are not necessarily limited to the effects herein described and may include any of the effects described in the present disclosure.

BRIEF DESCRIPTION OF DRAWINGS

FIG. 12 is a view for illustrating a premium service, a quasi-premium service, and an on-demand service.

FIG. 14 is a view illustrating a description example of an emsg box in FIG. 13.

FIG. 16 is a view illustrating a description example of an emsg box in a third embodiment.

FIG. 18 is a view illustrating a description example of an emsg box in a fourth embodiment.

FIGS. 22A and 22B are views illustrating a configuration example of a media segment file in the sixth embodiment.

FIG. 24 is a view illustrating an example of a data generation count table.

FIG. 25 is a view illustrating an example of a conversion table table1.

MODE FOR CARRYING OUT THE INVENTION

A mode for carrying out the present disclosure (hereinafter, referred to as an embodiment) is hereinafter described. Meanwhile, the description is given in the following order.

1. First Embodiment: Information Processing System (FIGS. 1 to 12)
2. Second Embodiment: Information Processing System (FIGS. 13 to 15)
3. Third Embodiment: Information Processing System (FIGS. 16 and 17)
4. Fourth Embodiment: Information Processing System (FIG. 18)
5. Fifth Embodiment: Information Processing System (FIG. 19)
6. Sixth Embodiment: Information Processing System (FIGS. 20 to 22)
7. Description of Lossless DSD system (FIGS. 23 to 26)
8. Seventh Embodiment: Computer (FIG. 27)

First Embodiment

Configuration Example of First Embodiment of Information Processing System

Figure 1:
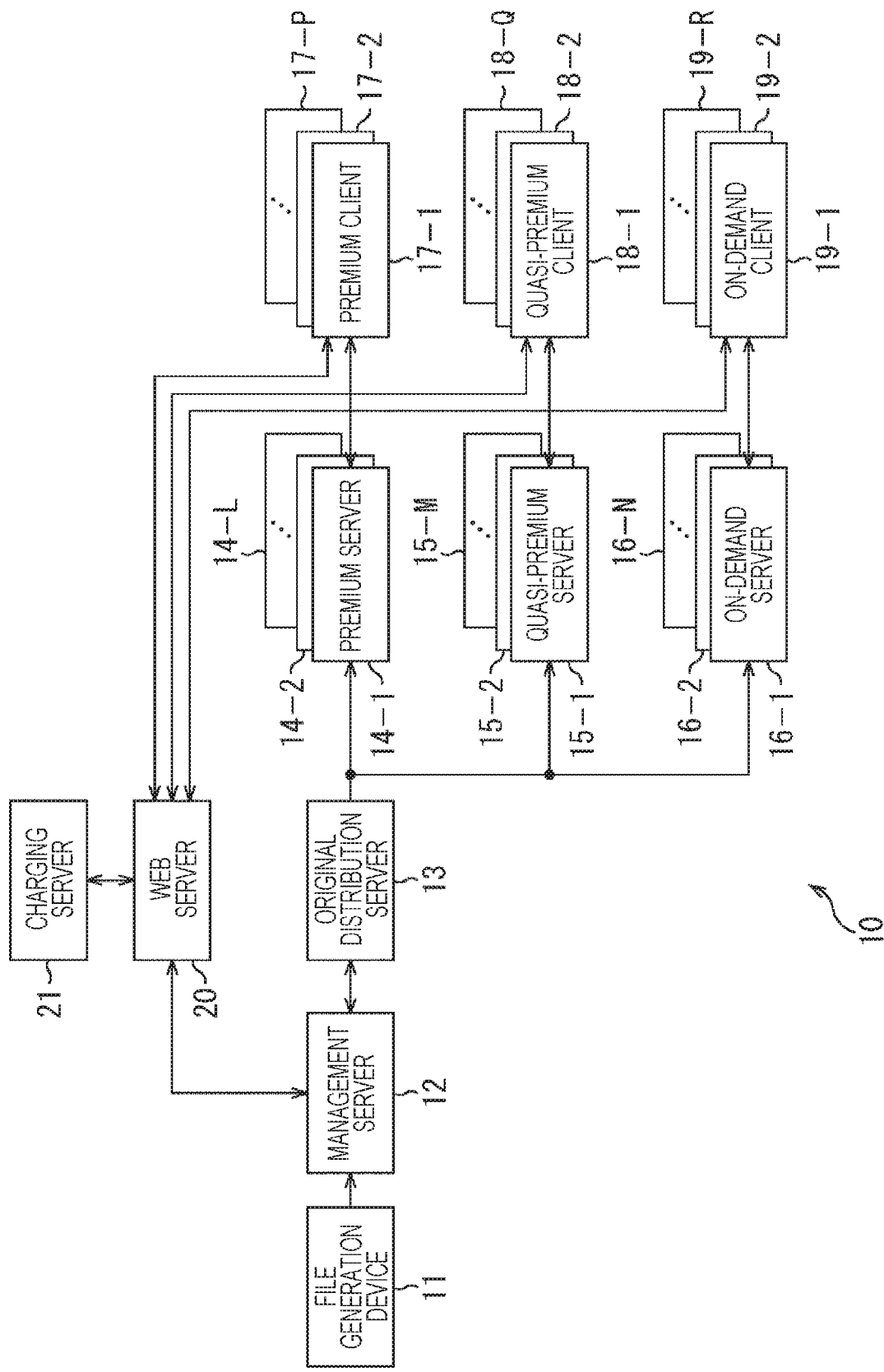
FIG. 1 is a block diagram illustrating a configuration example of a first embodiment of an information processing system to which the present disclosure is applied.

FIG. 1 is a block diagram illustrating a configuration example of a first embodiment of an information processing system to which the present disclosure is applied.

An information processing system 10 in FIG. 1 includes a file generation device 11, a management server 12, an original distribution server 13 (information processing device), premium servers 14-1 to 14-L (distribution devices), quasi-premium servers 15-1 to 15-M (distribution devices), on-demand servers 16-1 to 16-N (distribution devices), premium clients 17-1 to 17-P (information processing devices), quasi-premium clients 18-1 to 18-Q (information processing devices), on-demand clients 19-1 to 19-R (information processing devices), a web server 20, and an charging server 21.

In the example in FIG. 1, L to N and P to R are assumed to be integers not smaller than 2, but may also be 1. Also, in the following description, in a case where it is not necessary to especially distinguish the premium servers 14-1 to 14-L from one another, they are collectively referred to as the premium servers 14. Similarly, the quasi-premium servers 15-1 to 15-M, the on-demand servers 16-1 to 16-N, the premium clients 17-1 to 17-P, the quasi-premium clients 18-1 to 18-Q, and the on-demand client 19-1 to 19-R are collectively referred to as the quasi-premium servers 15, the on-demand servers 16, the premium clients 17, the quasi-premium clients 18, and the on-demand clients 19, respectively.

In the information processing system 10, a file of moving image content generated by the file generation device 11 is distributed to the premium client 17 by a premium service, distributed to the quasi-premium client 18 by a quasi-premium service, and distributed to the on-demand client 19 by an on-demand service.

Meanwhile, the premium service is the service that permits to start distributing the file of the moving image content from acquisition start time (event occurrence time) to acquisition finish time of the moving image content. By this premium service, a viewer may perform live viewing of the moving image content.

In addition, the quasi-premium service is the service that permits the distribution of the file of the moving image content after a lapse of a predetermined time from the acquisition start time of the moving image content. By this quasi-premium service, the viewer may perform the live viewing of the moving image content after a lapse of a predetermined time from the acquisition start time of the moving image content.

The on-demand service is the service that permits the distribution of the file of the stored moving image content after the acquisition of the moving image content is finished. By this on-demand service, the viewer may view the moving image content after the acquisition of the moving image content is finished.

The file generation device 11 of the information processing system 10 A/D converts a video analog signal and an audio analog signal of the moving image content to generate a video digital signal and an audio digital signal. Then, the file generation device 11 encodes signals such as the video digital signal and the audio digital signal of the moving image content at a plurality of bit rates by a predetermined encoding system to generate an encoded stream. Herein, it is assumed that the encoding system of the audio digital signal is a lossless DSD system or a moving picture experts group phase 4 (MPEG-4) system. The MPEG-4 system is a system of irreversibly compressing the audio digital signal A/D converted by a PCM system so that no underflow or overflow occurs in a fixed-size buffer.

The file generation device 11 files the generated encoded stream in time units from several seconds to ten seconds referred to as segments for each bit rate. The file generation device 11 uploads the segment file generated as a result to the management server 12.

The file generation device 11 also generates a media presentation description (MPD) file (management file) for managing the moving image content and uploads the same to the management server 12.

The management server 12 stores the MPD file and the segment file uploaded by the file generation device 11. The management server 12 extracts bit rate information and a maximum bit rate included in the MPD file. The bit rate information is the information indicating an actual bit rate of an audio stream which is the encoded stream of the audio digital signal stored in the segment file and includes an average value in a predetermined period of the bit rates. Also, the maximum bit rate is a maximum value which the bit rate of the audio stream may take.

The management server 12 also acquires the number of distribution clients and distribution start time from the web server 20. The number of distribution clients is the number of the premium clients 17, the quasi-premium clients 18, and the on-demand clients 19 which request to start distributing. Also, the distribution start time is the time at which each premium client 17, each quasi-premium client 18, and each on-demand client 19 request to start distributing.

The management server 12 transmits the bit rate information, the maximum bit rate, the number of distribution clients, and the distribution start time to the original distribution server 13 as a HyperText Transfer Protocol (HTTP) header or a Uniform Resource Locator (URL) query parameter. The management server 12 also transmits the stored MPD file and segment file to the original distribution server 13.

The original distribution server 13 stores the MPD file and the segment file transmitted from the management server 12. The original distribution server 13 determines the maximum bit rate transmitted from the management server 12 as a supposed bandwidth of the premium service. On the basis of the allowable number of premium clients 17 and the supposed bandwidth, the original distribution server 13 prepares L premium servers 14 required for guaranteeing the communication of the audio stream in the supposed bandwidth for the allowable number of premium clients 17.

The original distribution server 13 also determines a bit rate smaller than the maximum bit rate as a supposed bandwidth of the quasi-premium service on the basis of the maximum bit rate and predetermined bit rate information from the acquisition start time of the moving image content to time at which the distribution by the quasi-premium service is permitted. On the basis of the allowable number of quasi-premium clients 18 and the supposed bandwidth, the original distribution server 13 prepares M quasi-premium servers 15 required for guaranteeing the communication of the audio stream in the supposed bandwidth for the allowable number of the quasi-premium clients 18.

Furthermore, the original distribution server 13 determines the average value of the actual bit rates indicated by the predetermined bit rate information as the supposed bandwidth of the on-demand service. The original distribution server 13 prepares N on-demand servers 16 required for guaranteeing the communication of the audio stream in the supposed bandwidth to the predetermined number of on-demand clients 19.

Also, the original distribution server 13 (scaling unit) performs scaling of the premium servers 14 on the basis of the bit rate information, the number of distribution clients of the premium service (the number of premium clients 17 which request to start distributing), and the distribution start time. The original distribution server 13 transmits the stored MPD file and segment file to the premium server 14 after the scaling, that is, the used premium server 14 among the L premium servers 14.

Furthermore, the original distribution server 13 performs scaling of the quasi-premium servers 15 on the basis of the bit rate information, the number of distribution clients of the quasi-premium service (the number of quasi-premium clients 18 which request to start distributing), and the distribution start time. The original distribution server 13 transmits the stored MPD file and segment file to the quasi-premium server 15 after the scaling, that is, the used quasi-premium server 15 among the M quasi-premium servers 15.

Also, the original distribution server 13 performs scaling of the on-demand servers 16 on the basis of the number of distribution clients of the on-demand service (the number of on-demand clients 19 which request to start distributing) and the distribution start time. The original distribution server 13 transmits the stored MPD file and segment file to the on-demand server 16 after the scaling, that is, the used on-demand server 16 among the N on-demand servers 16.

The premium server 14 after the scaling stores the MPD file and the segment file transmitted from the original distribution server 13 and serves as a DASH server. The premium server 14 after the scaling distributes the stored MPD file and segment file to the premium client 17 by the premium service.

Specifically, the premium server 14 after the scaling permits the distribution of the MPD file and the segment file to the premium client 17 which acquires a premium license being the license of the premium service when starting acquiring the moving image content, that is, when starting generating the MPD file and the segment file of the moving image content. Meanwhile, in this specification, right information required when acquiring and reproducing the moving image content is described as the license. Herein, the license is the right information required when acquiring the moving image content such as information used for user authentication, information used for user account and device authentication, and information used for acquiring a token generated by a device authentication protocol or a user authentication protocol on a server side. Meanwhile, the license may also be right information required for reproducing the moving image content such as a spare key and usage for reproducing the moving image content protected by digital rights management (DRM). Then, in a case where there is a request from the premium client 17 from the acquisition start time to the acquisition finish time of the moving image content, the premium server 14 after the scaling distributes the stored MPD file and segment file to the premium client 17 via the Internet.

Also, the quasi-premium server 15 after the scaling stores the MPD file and the segment file transmitted from the original distribution server 13 and serves as the DASH server. The quasi-premium server 15 after the scaling distributes the stored MPD file and segment file to the quasi-premium client 18 by the quasi-premium service.

Specifically, the quasi-premium server 15 after the scaling permits the distribution of the MPD file and the segment file to the quasi-premium client 18 which acquires a quasi-premium license being the license of the quasi-premium service after a lapse of a predetermined time after the acquisition of the moving image content is started, that is, after a lapse of a predetermined time after the generation of the MPD file and the segment file of the moving image content is started. Then, in a case where there is a request from the quasi-premium client 18 after a lapse of a predetermined time from the acquisition start time to the acquisition finish time of the moving image content, the quasi-premium server 15 after the scaling distributes the stored MPD file and segment file to the quasi-premium client 18 via the Internet.

Furthermore, the on-demand server 16 after the scaling stores the MPD file and the segment file transmitted from the original distribution server 13 and serves as the DASH server. The on-demand server 16 after the scaling distributes the stored MPD file and segment file to the on-demand client 19 by the on-demand service.

Specifically, the on-demand server 16 after the scaling permits the distribution of the MPD file and the segment file to the on-demand client 19 which acquires an on-demand license being the license of the on-demand service after the acquisition of the moving image content is finished, that is, after the generation of the MPD file and the segment file of the moving image content is finished. Then, in a case where there is a request from the on-demand client 19 after the acquisition of the moving image content is finished, the on-demand server 16 after the scaling distributes the stored MPD file and segment file to the on-demand client 19 via the Internet.

The premium client 17 is the DASH client which requests the web server 20 to distribute by the premium service. The premium client 17 acquires premium server information which specifies the premium server 14 and the premium license transmitted from the web server 20 in response to the request.

In addition, the premium client 17 requests the web server 20 to start distributing the moving image content and requests the premium server 14 to distribute the MPD file on the basis of the premium server information and the premium license. Also, the premium client 17 receives the MPD file distributed from the premium server 14 in response to the request, and requests the premium server 14 to distribute the segment file on the basis of the MPD file, the premium server information, and the premium license. Then, the premium client 17 receives the segment file distributed from the premium server 14 in response to the request.

The premium client 17 reproduces the received segment file. Specifically, the premium client 17 decodes the encoded stream stored in the received segment file. The premium client 17 allows a display device such as a display not illustrated to display an image on the basis of the video digital signal acquired as a result of the decoding. Also, the premium client 17 D/A converts the audio digital signal acquired as a result of the decoding, and allows an output unit such as a speaker not illustrated to output audio on the basis of the audio analog signal acquired as a result.

The quasi-premium client 18 is the DASH client which requests the web server 20 to distribute by the quasi-premium service. The quasi-premium client 18 acquires quasi-premium server information which specifies the quasi-premium server 15 and the quasi-premium license transmitted from the web server 20 in response to the request.

In addition, the quasi-premium client 18 requests the web server 20 to start distributing the moving image content and requests the quasi-premium server 15 to distribute the MPD file on the basis of the quasi-premium server information and the quasi-premium license. Also, the quasi-premium client 18 receives the MPD file distributed from the quasi-premium server 15 in response to the request, and requests the quasi-premium server 15 to distribute the segment file on the basis of the MPD file, the quasi-premium server information, and the quasi-premium license. Then, the quasi-premium client 18 receives the segment file distributed from the quasi-premium server 15 in response to the request, and reproduces the segment file as is the case with the premium client 17.

The on-demand client 19 is the DASH client which requests the web server 20 to distribute by the on-demand service. The on-demand client 19 acquires on-demand server information which specifies the on-demand server 16 and the on-demand license in response to the request.

In addition, the on-demand client 19 requests the web server 20 to start distributing the moving image content and requests the on-demand server 16 to distribute the MPD file on the basis of the on-demand server information and the on-demand license. Also, the on-demand client 19 receives the MPD file distributed from the on-demand server 16 in response to the request, and requests the on-demand server 16 to distribute the segment file on the basis of the MPD file, the on-demand server information, and the on-demand license. Then, the on-demand client 19 receives the segment file distributed from the on-demand server 16 in response to the request, and reproduces the segment file as is the case with the premium client 17.

The web server 20 requests the charging server 21 to perform processing of charging the premium client 17 a fee for the premium service in response to the request from the premium client 17. The web server 20 generates the premium server information and the premium license according to notification of completion of the charging processing supplied from the charging server 21 and transmits them to the premium client 17.

Similarly, the web server 20 requests the charging server 21 to perform processing of charging the quasi-premium client 18 a fee for the quasi-premium service in response to the request from the quasi-premium client 18. The web server 20 generates the quasi-premium server information and the quasi-premium license according to notification of completion of the charging processing supplied from the charging server 21 and transmits them to the quasi-premium client 18.

Also, the web server 20 requests the charging server 21 to perform processing of charging the on-demand client 19 a fee for the on-demand service in response to the request from the on-demand client 19. The web server 20 generates the on-demand server information and the on-demand license according to notification of completion of the charging processing supplied from the charging server 21 and transmits them to the on-demand client 19.

Furthermore, the web server 20 supplies the management server 12 with the number of premium clients 17 which request to start distributing the moving image content from the acquisition start time to the acquisition finish time of the moving image content and the distribution start time. The web server 20 also supplies the management server 12 with the number of quasi-premium clients 18 which request to start distributing the moving image content from after a lapse of a predetermined time from the acquisition start time to the acquisition finish time of the moving image content and the distribution start time. Furthermore, the web server 20 supplies the management server 12 with the number of on-demand clients 19 which request to start distributing the moving image content after the acquisition of the moving image content is finished and the distribution start time.

The charging server 21 (charging processing device) performs the processing of charging the premium client 17 the fee for the premium service in response to the request supplied from the web server 20. Also, the charging server 21 performs the processing of charging the quasi-premium client 18 the fee for the quasi-premium service in response to the request supplied from the web server 20. Furthermore, the charging server 21 performs the processing of charging the on-demand client 19 the fee for the on-demand service in response to the request supplied from the web server 20, Meanwhile, the fees of the charging processes are in a descending order from the premium service, the quasi-premium service, and the on-demand service. When the charging processing is completed, the charging server 21 notifies the web server 20 of the completion of the charging processing.

Meanwhile, communication in the information processing system 10 may be performed wirelessly or by wire.

(Description of DSD System)

Figure 2:
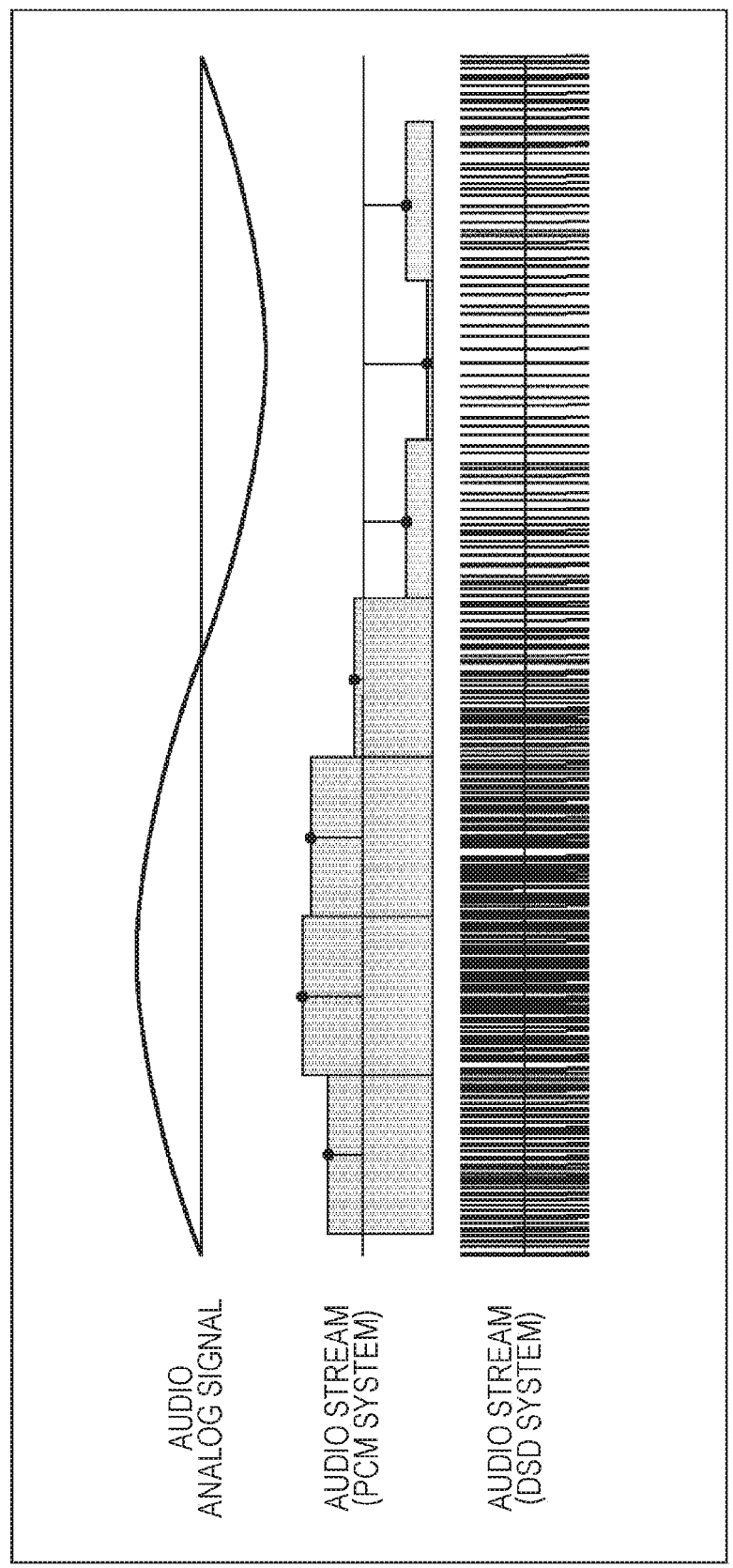
FIG. 2 is a view for illustrating a DSD system.

FIG. 2 is a view for illustrating a DSD system.

In FIG. 2, time is plotted along the abscissa and a value of each signal is plotted along the ordinate.

In an example in FIG. 2, a waveform of the audio analog signal is a sine wave. In a case where such audio analog signal is A/D converted by a PCM system, as illustrated in FIG. 2, the value of the audio analog signal at each sampling time is converted into a fixed number-bit audio digital signal according to the value.

On the other hand, in a case where the audio analog signal is A/D converted by the DSD system, the value of the audio analog signal at each sampling time is converted into the audio digital signal of density of change points between "0" and "1" according to the value. Specifically, as the value of the audio analog signal is larger, the density of the change points of the audio digital signal is higher, and as the value of the audio analog signal is smaller, the density of the change points of the audio digital signal is lower. That is, a pattern of "0" and "1" of the audio digital signal changes according to the value of the audio analog signal.

Therefore, a bit generation amount of the audio stream acquired by encoding this audio digital signal by the lossless DSD system in which lossless compression encoding is performed on the basis of the pattern of "0" and "1" varies depending on the waveform of the audio analog signal. Therefore, it is difficult to predict the bit rate in advance.

(Configuration Example of File Generation Device)

Figure 3:
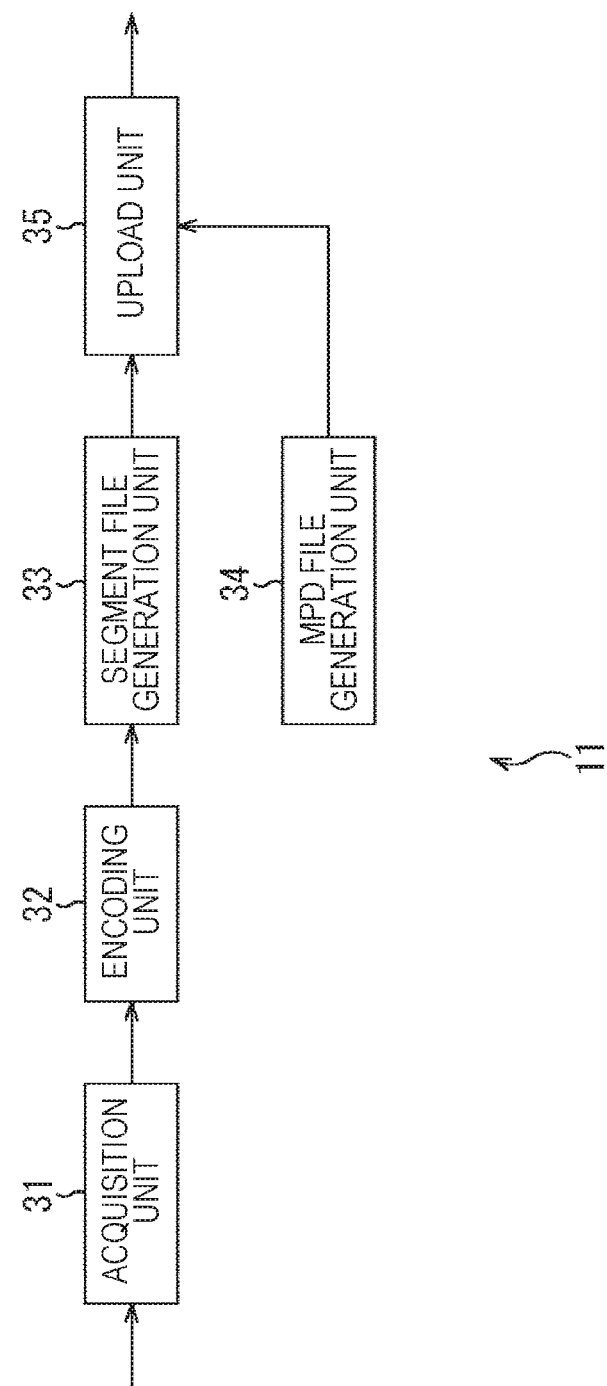
FIG. 3 is a block diagram illustrating a configuration example of a file generation device in FIG. 1.

FIG. 3 is a block diagram illustrating a configuration example of the file generation device in FIG. 1.

The file generation device 11 in FIG. 3 includes an acquisition unit 31, an encoding unit 32, a segment file generation unit 33, an MPD file generation unit 34, and an upload unit 35.

The acquisition unit 31 of the file generation device 11 acquires the video analog signal and the audio analog signal of the moving image content and performs the A/D conversion. The acquisition unit 31 supplies the encoding unit 32 with signals such as the video digital signal and the audio digital signal acquired as a result of the A/D conversion and other signals of the moving image content acquired. The encoding unit 32 encodes the signal of the moving image content supplied from the acquisition unit 31 at a plurality of bit rates and generates the encoded stream. The encoding unit 32 supplies the generated encoded stream to the segment file generation unit 33.

The segment file generation unit 33 files the encoded stream supplied from the encoding unit 32 in segment units for each bit rate. The segment file generation unit 33 supplies a segment file generated as a result to the upload unit 35.

The MPD file generation unit 34 calculates an average value from an integration value of the actual bit rates of the audio stream encoded by the encoding unit 32 by the lossless DSD system for each reference period, thereby calculating the average value of the actual bit rates of the audio stream in a predetermined period increasing by the reference period.

Then, the MPD file generation unit 34 generates, for each reference period, the calculated average value and a predetermined period corresponding to the average value as the bit rate information. The MPD file generation unit 34 generates the MPD file including the bit rate information, the information indicating the encoding system of the audio stream, the maximum bit rate of the audio stream, the bit rate of the video stream which is the encoded stream of the video digital signal and the like. The MPD file generation unit 34 supplies the MPD file to the upload unit 35.

The upload unit 35 uploads the segment file supplied from the segment file generation unit 33 and the MPD file supplied from the MPD file generation unit 34 to the management server 12 in FIG. 1.

(First Description Example of MPD File)

Figure 4:
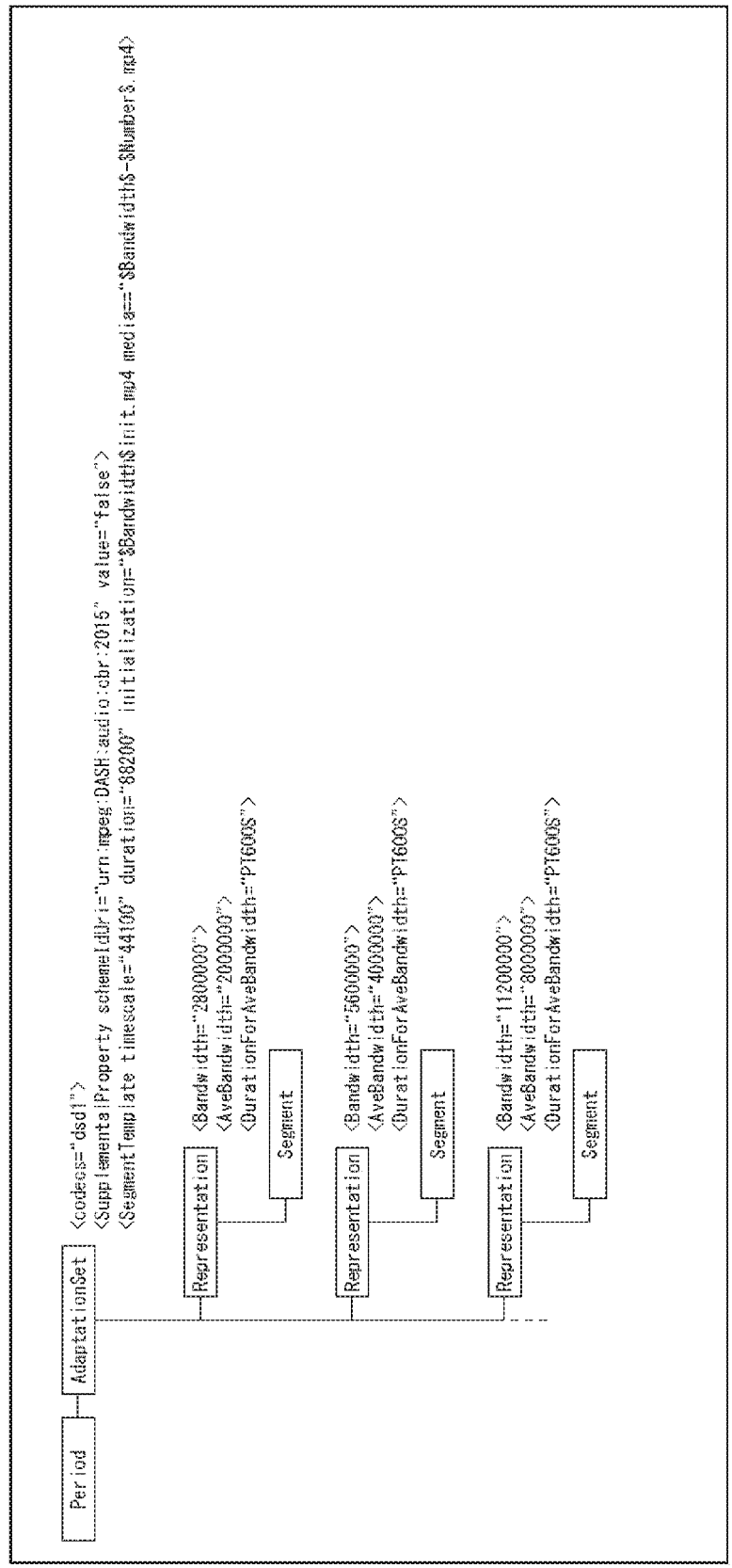
FIG. 4 is a view illustrating a first description example of an MPD file in the first embodiment.

FIG. 4 is a view illustrating a first description example of the MPD file.

Meanwhile, for convenience of description, FIG. 4 illustrates only a description to manage the segment file of the audio stream out of the descriptions of the MPD file. The same applies to FIGS. 5, 20, and 21 to be described later.

In the MPD file, the information such as the encoding system and the bit rate of the moving image content, a size of the image, a language of the audio and the like are layered to be described in XML.

As illustrated in FIG. 4, the MPD file hierarchically includes elements such as period (Period), adaptation set (AdaptationSet), representation (Representation), segment information (Segment) and the like.

In the MPD file, the moving image content managed by himself/herself is divided into predetermined time ranges (for example, a unit of a program, a commercial (CM) and the like). The period element is described for each divided moving image content. The period element includes information such as reproduction start time of the moving image content, a uniform resource locator (URL) of the management server 12 which stores the segment file of the moving image content, and MinBufferTime as information common to the corresponding moving image content. MinBufferTime is information indicating a buffer time of a virtual buffer, and is set to 0 in the example in FIG. 4.

The adaptation set element is included in the period element and groups the representation elements corresponding to the segment file group of the same encoded stream of the moving image content corresponding to the period element. For example, the representation elements are grouped according to a type of data of the corresponding segment file group. In the example in FIG. 4, three representation elements corresponding to the segment files of three types of audio streams having different bit rates are grouped by one adaptation set element.

The adaptation set element includes a media type, the language, applications such as a subtitle or dubbing, max-Bandwidth and MinBandwidth which are the maximum value and the minimum value of the bit rate and the like, as information common to the group of the corresponding segment file groups.

Meanwhile, in the example in FIG. 4, the encoding system of all the three types of audio streams with different bit rates is the lossless DSD system. Therefore, the adaptation set element of the segment file of the audio stream also includes <codecs="dsd1"> indicating that the encoding system of the audio stream is the lossless DSD system as information common to the group.

This also includes <SupplementalProperty schemeIdUri="urn:mpeg:DASH:audio:cbr:2015"> which is a descriptor indicating whether the encoding system of the audio stream is a system of encoding to that no underflow or overflow occurs in the fixed-size buffer such as the MPEG-4 system (hereinafter referred to as a fixed system).

The value (value) of <SupplementalProperty schemeIdUri="urn:mpeg:DASH:audio:cbr:2015"> is set to true in a case where it is indicated that the encoding system of the audio stream is the fixed system, and is set to false in a case where it is indicated that this is not the fixed system. Therefore, in the example in FIG. 4, the value of <SupplementalProperty schemeIdUri="urn:mpeg:DASH:audio:cbr:2015"> is false.

The adaptation set element also includes SegmentTemplate indicating a segment length and a rule of a file name of the segment file. In SegmentTemplate, timescale, duration, initialization, and media are described.

Timescale is a value representing one second and duration is a value of the segment length when timescale is set to one second. In the example in FIG. 4, timescale is 44100 and duration is 88200. Therefore, the segment length is two seconds.

Initialization is information indicating a rule of a name of an initialization segment file in the segment file of the audio stream. In the example in FIG. 4, initialization is "$Bandwidth$init.mp4". Therefore, the name of the initialization segment file of the audio stream is acquired by adding init to Bandwidth included in the representation element.

Also, media is information indicating a rule of a name of a media segment file out of the segment file of the audio stream. In the example in FIG. 4, media is "$Bandwidth$-$Number$.mp4". Accordingly, the name of the media segment file of the audio stream is acquired by adding "-" to Bandwidth included in the representation element and adding sequential number.

The representation elements are included in the adaptation set element which groups them and are described for each segment file group of the same encoded stream of the moving image content corresponding to an upper layer period element. The representation element has Bandwidth, AveBandwidth, DurationForAveBandwidth indicating the bit rate, image size and the like as information common to the corresponding segment file group.

Meanwhile, in a case where the encoding system is the lossless DSD system, the actual bit rate of the audio stream cannot be predicted. Therefore, in the representation element corresponding to the audio stream, the maximum bit rate of the audio stream is described as the bit rate common to the corresponding segment file group.

In the example in FIG. 4, the maximum bit rates of the three types of audio streams are 2.8 Mbps, 5.6 Mbps, and 11.2 Mbps. Therefore, Bandwidths of the three representation elements are 2800000, 5600000, and 11200000. In addition, MinBandwidth of the adaptation set element is 2800000, and maxBandwidth thereof is 11200000.

AveBandwidth is information indicating the average value of the bit rate information of the audio stream corresponding to the representation element, and DurationForAveBandwidth is information indicating a predetermined period.

In the example in FIG. 4, the MPD file generation unit 34 calculates the average value of the actual bit rates of the audio stream of 600 seconds from a beginning. Therefore, DurationForAveBandwidth included in three representation elements is PT600S indicating 600 seconds.

In addition, the average value of the actual bit rates in 600 seconds from the beginning of the audio stream of the lossless DSD system having the maximum bit rate corresponding to the first representation element of 2.8 Mbps is 2 Mbps. Therefore, AveBandwidth included in the first representation element is 2000000.

The average value of the actual bit rates in 600 seconds from the beginning of the audio stream of the lossless DSD system having the maximum bit rate corresponding to the second representation element of 5.6 Mbps is 4 Mbps. Therefore, AveBandwidth included in the second representation element is 4000000.

The average value of the actual bit rates in 600 seconds from the beginning of the audio stream of the lossless DSD system having the maximum bit rate corresponding to the third representation element of 11.2 Mbps is 8 Mbps. Therefore, AveBandwidth included in the third representation element is 8000000.

The segment info element is included in the representation element and includes information regarding each segment file of the segment file group corresponding to the representation element.

Meanwhile, in the example in FIG. 4, <codecs="dsd1"> and <SupplementalProperty schemeIdUri="urn:mpeg:

DASH:audio:cbr:2015"value="false"> are described in the adaptation set element, they may also be described in each representation element.

(Second Description Example of MPD File)

Figure 5:
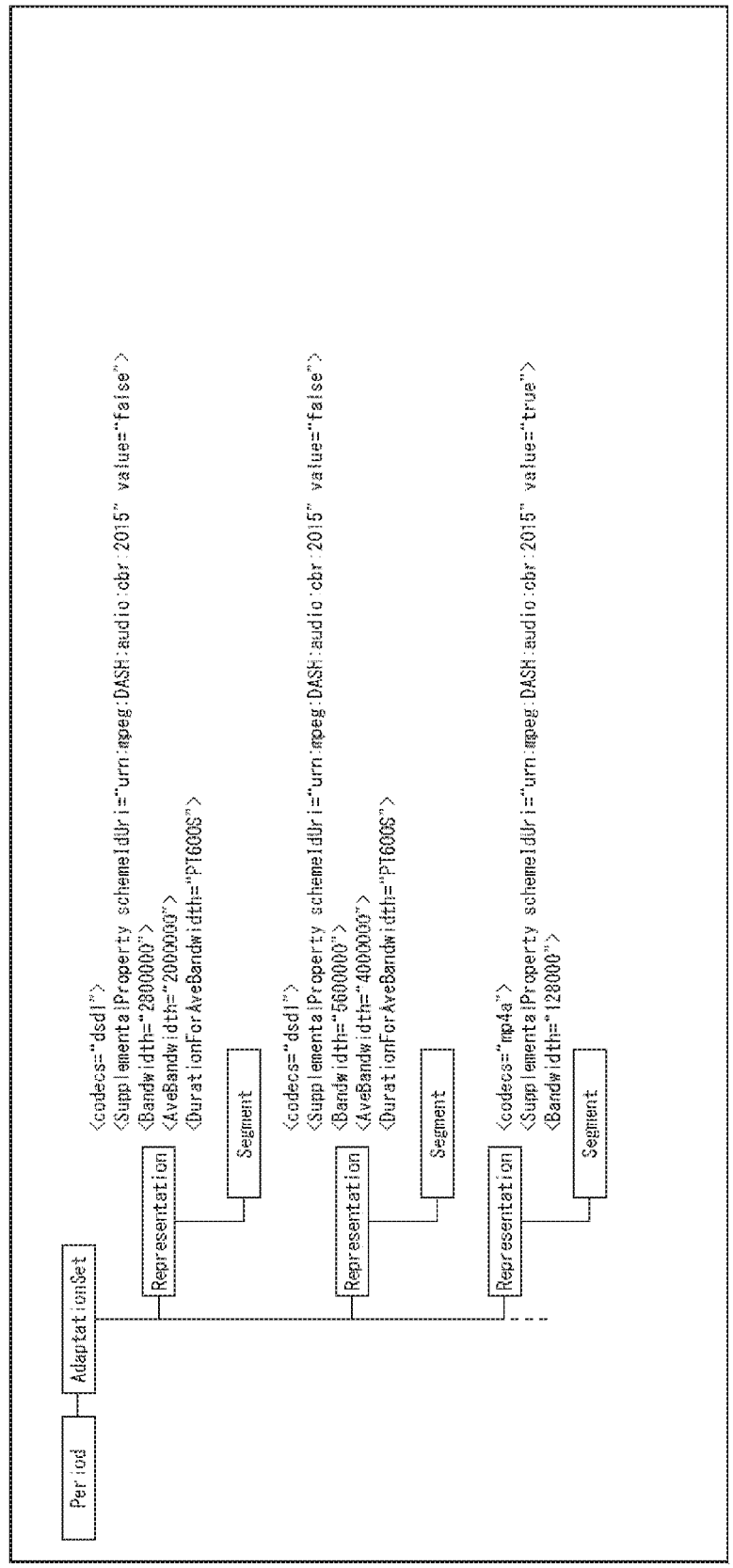
FIG. 5 is a view illustrating a second description example of the MPD file in the first embodiment.

FIG. 5 is a view illustrating a second description example of the MPD file.

In the example in FIG. 5, the encoding system of two types of audio streams among the three types of audio streams with different bit rates is the lossless DSD system, and the encoding system of one type of audio stream is the MPEG-4 system.

Therefore, in the MPD file in FIG. 5, the adaptation set element does not include <codecs="dsd1"> and <SupplementalProperty schemeIdUri="urn:mpeg:DASH:audio:cbr:2015"value="false">. Instead, the representation set element includes the information indicating the encoding system of the audio stream and <SupplementalProperty schemeIdUri="urn:mpeg:DASH:audio:cbr:2015">.

Specifically, in the example in FIG. 5, the encoding system of the audio stream corresponding to the first representation set element is the lossless DSD system, and the maximum bit rate is 2.8 Mbps. Also, the average value of the bit stream information corresponding to the first representation element is 2 Mbps, and the predetermined period is 600 seconds. Therefore, the first representation set element includes <codecs="dsd1">, <SupplementalProperty schemeIdUri="urn:mpeg:DASH:audio:cbr:2015"value="false">, 2800000 as Bandwidth, 2000000 as AveBandwidth, and PT600S as DurationForAveBandwidth.

Also, in the example in FIG. 5, the encoding system of the audio stream corresponding to the second representation set element is the lossless DSD system, and the maximum bit rate is 5.6 Mbps. Also, the average value of the bit stream information corresponding to the second representation element is 4 Mbps, and the predetermined period is 600 seconds. Therefore, the second representation set element includes <codecs="dsd1">, <SupplementalProperty schemeIdUri="urn:mpeg:DASH:audio:cbr:2015"value="false">, 5600000 as Bandwidth, 4000000 as AveBandwidth, and PT600S as DurationForAveBandwidth.

Furthermore, the encoding system of the audio stream corresponding to the third representation set element is the MPEG-4 system, and the actual bit rate is 128 kbps. Therefore, the first representation set element includes <codecs="mp4a">, <SupplementalProperty schemeIdUri="urn:mpeg:DASH:audio:cbr:2015"value="true">, and 128000 as Bandwidth. Meanwhile, <codecs="mp4a"> is information indicating that the encoding system of the audio stream is the MPEG-4 system.

As described above, in the MPD file in FIG. 4 and FIG. 5, AveBandwidth and DurationForAveBandwidth may be described in addition to <codecs="dsd1"> and <SupplementalProperty schemeIdUri="urn:mpeg:DASH:audio:cbr:2015"> in the MPD file in which the system other than the fixed system is not supposed as the encoding system of the audio stream.

Therefore, the MPD file in FIGS. 4 and 5 is compatible with the MPD file in which the system other than the fixed system is not supposed as the encoding system of the audio stream. In addition, the management server 12, the premium client 17, the quasi-premium client 18, and the on-demand client 19 may recognize that the encoding system of the audio stream is not the fixed system on the basis of <SupplementalProperty schemeIdUri="urn:mpeg:DASH:audio:cbr:2015"value="false"> described in the MPD file.

Although not illustrated, the MPD file in FIG. 4 and FIG. 5 also includes minimumUpdatePeriod indicating the reference period as an update interval of the MPD file. Then, the premium client 17, the quasi-premium client 18, and the on-demand client 19 update the MPD file at the update interval indicated by minimumUpdatePeriod. Therefore, the MPD file generation unit 34 may easily change the update interval of the MPD file only by changing minimumUpdatePeriod described in the MPD file.

Meanwhile, in a case of calculating the average value from the integration value acquired by integrating up to the bit rate of the last audio stream of the moving image content, the MPD file generation unit 34 may describe the time of the moving image content as DurationForAveBandwidth or may omit describing DurationForAveBandwidth.

In addition, AveBandwidth and DurationForAveBandwidth in FIG. 4 and FIG. 5 may be described not as a parameter of the representation element but as a SupplementalProperty descriptor.

Furthermore, it is also possible to describe the integration value of the actual bit rates of the audio stream in a predetermined period in place of AveBandwidth in FIG. 4 and FIG. 5.

(Configuration Example of Premium Client)

Figure 6:
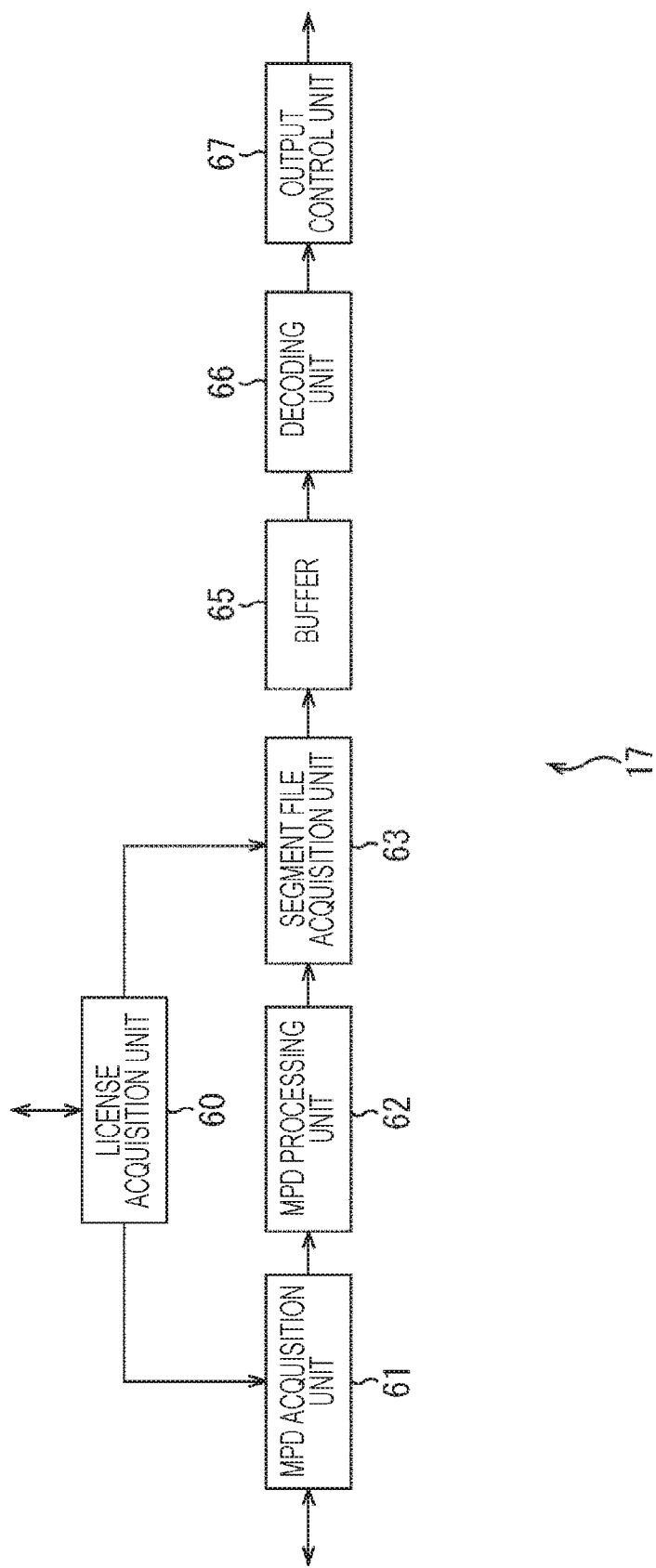
FIG. 6 is a block diagram illustrating a configuration example of a premium client.

FIG. 6 is a block diagram illustrating a configuration example of the premium client 17 in FIG. 1.

The premium client 17 includes a license acquisition unit 60, an MPD acquisition unit 61, an MPD processing unit 62, a segment file acquisition unit 63, a buffer 65, a decoding unit 66, and an output control unit 67.

The license acquisition unit 60 of the premium client 17 requests the web server 20 in FIG. 1 to distribute by the premium service. The license acquisition unit 60 acquires the premium server information and the premium license transmitted from the web server 20 in response to the request. The premium client 17 supplies the acquired premium server information and premium license to the MPD acquisition unit 61 and the segment file acquisition unit 63.

The MPD acquisition unit 61 requests the web server 20 to start distributing the moving image content. In addition, the MPD acquisition unit 61 requests the premium server 14 to distribute the MPD file on the basis of the premium server information and the premium license supplied from the license acquisition unit 60 and acquires the same. The MPD acquisition unit 61 supplies the acquired MPD file to the MPD processing unit 62.

The MPD processing unit 62 analyzes the MPD file supplied from the MPD acquisition unit 61. Specifically, the MPD processing unit 62 acquires the update interval indicated by minimumUpdatePeriod from the MPD file. In addition, the MPD processing unit 62 acquires acquisition information such as Bandwidth of each encoded stream, the URL and a file name of the segment file storing each encoded stream.

Also, in a case where the encoded stream is the audio stream, on the basis of the value of <SupplementalProperty schemeIdUri="urn:mpeg:DASH:audio:cbr:2015">, the MPD processing unit 62 recognizes whether the encoding system of the audio stream corresponding to the value is the fixed system. Then, the MPD processing unit 62 generates encoding system information indicating whether the encoding system of each audio stream is the fixed system.

In a case where the encoding system information indicates that the system is not the fixed system, the MPD processing unit 62 acquires AveBandwidth of the audio stream and make the same a selection bit rate. In addition, in a case where the encoding system information indicates that the system is the fixed system, the MPD processing unit 62 makes Bandwidth of the audio stream the selection bit rate.

The MPD processing unit 62 supplies Bandwidth and the acquisition information of each video stream, and the selection bit rate, the acquisition information, and the encoding system information of each audio stream to the segment file acquisition unit 63.

On the basis of the network bandwidth with the premium server 14, Bandwidth of each video stream, and the selection bit rate of each audio stream, the segment file acquisition unit 63 selects Bandwidth of the video stream and the selection bit rate of the audio stream.

Then, on the basis of the premium server information, the premium license, and the acquisition information of the segment file at the reproduction time of the video stream of selected Bandwidth and the audio stream of the selection bit rate, the segment file acquisition unit 63 requests to distribute the segment file. The segment file acquisition unit 63 acquires the segment file transmitted from the premium server 14 in response to the request in the segment unit. The segment file acquisition unit 63 supplies the encoded stream stored in the acquired segment file to the buffer 65 to be held.

The buffer 65 temporarily holds the encoded stream supplied from the segment file acquisition unit 63.

The decoding unit 66 reads the encoded stream from the buffer 65 to decode, and generates the video digital signal and the audio digital signal of the moving image content. The decoding unit 66 supplies the output control unit 67 with the generated video digital signal and audio digital signal.

The output control unit 67 allows the display unit such as the display not illustrated to display the image on the basis of the video digital signal supplied from the decoding unit 66. Also, the output control unit 67 performs digital/analog (D/A) conversion on the audio digital signal supplied from the decoding unit 66. On the basis of the audio analog signal acquired as a result of the D/A conversion, the output control unit 67 allows the output unit such as the speaker not illustrated to output audio.

Meanwhile, a configuration of the quasi-premium client 18 is the same as the configuration of the premium client 17 in FIG. 6 except that the premium service is replaced by the quasi-premium service and a distribution source is the quasi-premium server 15, so that the description thereof is not repeated. Also, a configuration of the on-demand client 19 is the same as the configuration of the premium client 17 in FIG. 6 except that the premium service is replaced by the on-demand service and the distribution source is the on-demand server 16, so that the description thereof is not repeated.

(Description of Processing of Information Processing System)

Figure 7:
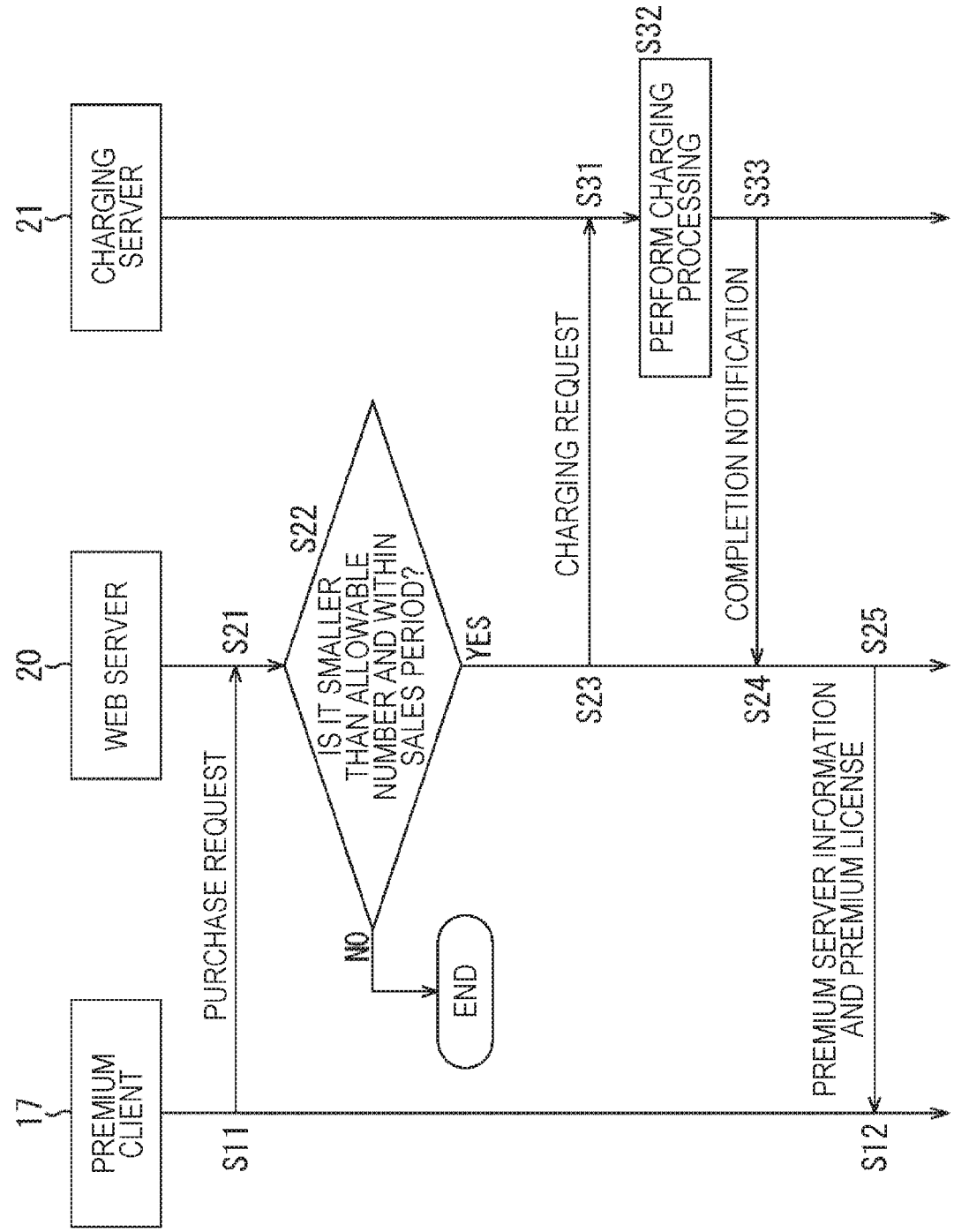
FIG. 7 is a flowchart for illustrating premium service purchase processing.

FIG. 7 is a flowchart for illustrating premium service purchase processing of the information processing system 10 in FIG. 1.

At step S11 in FIG. 7, the license acquisition unit 60 (FIG. 6) of the premium client 17 transmits a purchase request requesting distribution by the premium service to the web server 20 in FIG. 1.

At step S21, the web server 20 receives the purchase request transmitted from the premium client 17. At step S22, the web server 20 determines whether the number of premium clients 17 to whom the premium license is already transmitted is smaller than the allowable number and current date and time is within a sales period of the premium service.

In a case where it is determined at step S22 that the number of premium clients 17 to whom the premium license is already transmitted is smaller than the allowable number and the current date and time is within the sales period of the premium service, the procedure shifts to step S23. At step S23, the web server 20 transmits to the charging server 21 a charging request to request the processing of charging the premium client 17 the fee for the premium service.

At step S31, the charging server 21 receives the charging request transmitted from the web server 20. At step S32, the charging server 21 performs the processing of charging the premium client 17 the fee for the premium service. At step S33, this transmits completion notification of the charging processing to the web server 20.

At step S24, the web server 20 receives the completion notification transmitted from the charging server 21. At step S25, the web server 20 generates the premium server information and the premium license and transmits the same to the premium client 17.

At step S12, the license acquisition unit 60 (FIG. 6) of the premium client 17 receives the premium server information and the premium license transmitted from the web server 20, and supplies them to the MPD acquisition unit 61 and the segment file acquisition unit 63. Then, the procedure ends.

On the other hand, in a case where it is determined at step S23 that the number of premium clients 17 to whom the premium license is already transmitted is not smaller than the allowable number or the current date and time is not within the sales period of the premium service, the procedure ends.

Quasi-premium service purchase processing in which the quasi-premium client 18 receives the quasi-premium server information and the premium license is similar to the premium service purchase processing in FIG. 7 except that the premium service is replaced by the quasi-premium service.

In addition, on-demand service purchase processing in which the on-demand client 19 receives the on-demand server information and the on-demand license is similar to the premium service purchase processing except that the premium service is replaced by the on-demand service and a condition that the number of on-demand clients 19 to whom the on-demand license is already transmitted is smaller than the allowable number in the determination processing at step S22 is deleted.

Meanwhile, the charging system of the premium service, the quasi-premium service, and the on-demand service may be a pay-per-view system to perform the charging processing for each moving image content or a subscription service system to perform the charging processing for a viewing period. The premium license, the quasi-premium license, and the on-demand license are the licenses that enable acquisition and reproduction of predetermined moving image content in a case where the charging system is the pay-per-view system, but are the licenses that enable acquisition and reproduction of arbitrary moving image content only within a predetermined period in a case of the subscription service system.

Figure 8:
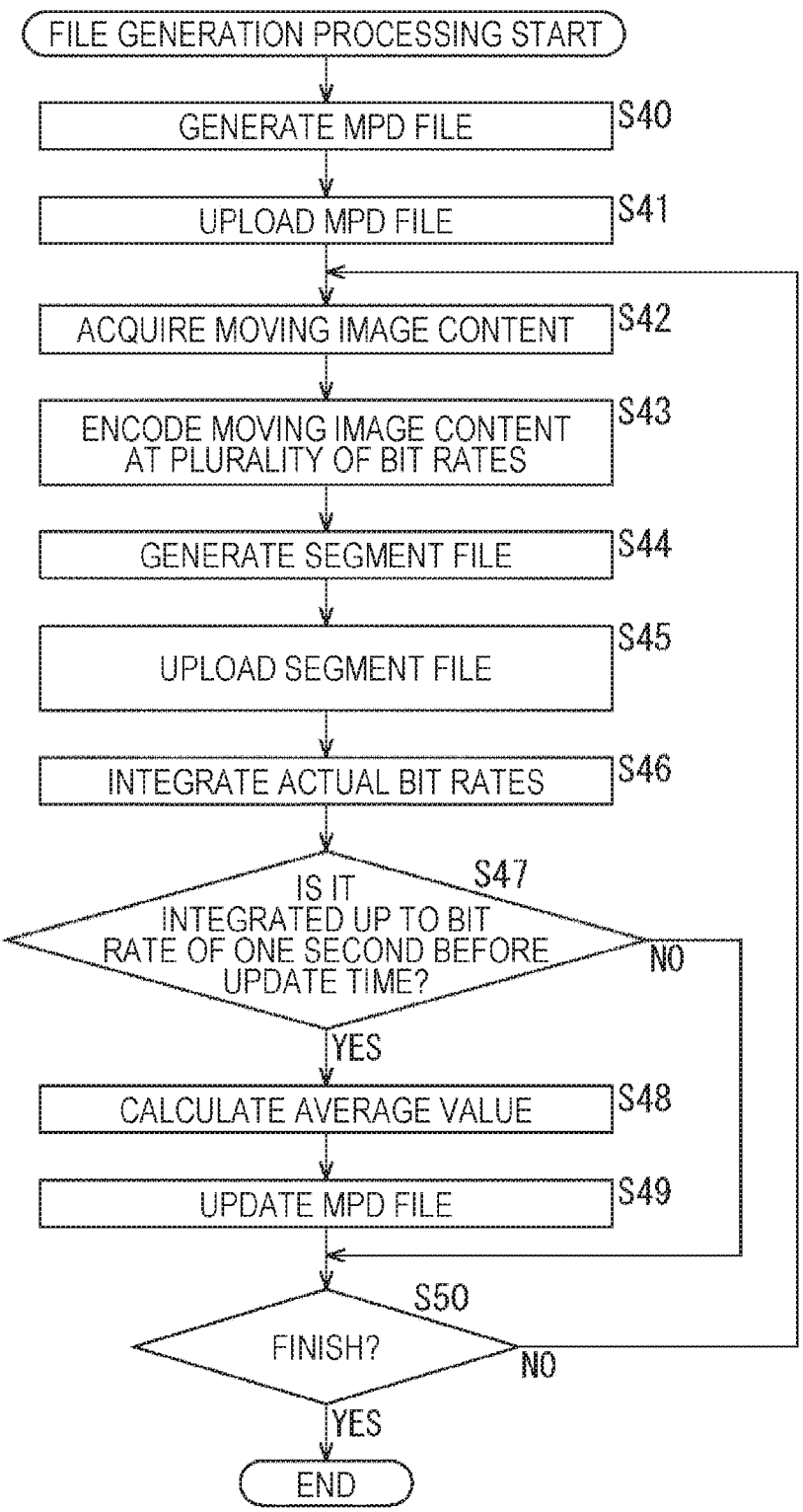
FIG. 8 is a flowchart for illustrating file generation processing in the first embodiment.

FIG. 8 is a flowchart for illustrating file generation processing of the file generation device 11 in FIG. 1. This file generation processing is performed in a case where at least one of the encoding systems of the audio stream is the lossless DSD system.

At step S40 in FIG. 8, the MPD file generation unit 34 of the file generation device 11 generates the MPD file. At that time, since the average value of the actual bit rates of the audio stream is not yet calculated, for example, the same value as Bandwidth is described in AveBandwidth of the MPD file, and PT0S indicating 0 second is described in DurationForAveBandwidth. Also, in minimumUpdatePeriod of the MPD file, for example, a reference period ΔT is set. The MPD file generation unit 34 supplies the generated MPD file to the upload unit 35.

At step S41, the upload unit 35 uploads the MPD file supplied from the MPD file generation unit 34 to the management server 12. The MPD file uploaded to the management server 12 is transmitted to the original distribution server 13 to be stored.

At step S42, the acquisition unit 31 acquires the video analog signal and the audio analog signal of the moving image content in the segment unit and performs the A/D conversion. The acquisition unit 31 supplies the encoding unit 32 with signals such as the video digital signal and the audio analog signal acquired as a result of the A/D conversion, and other signals of the moving image content in the segment unit.

At step S43, the encoding unit 32 encodes the signal of the moving image content supplied from the acquisition unit 31 at a plurality of bit rates by a predetermined encoding system to generate the encoded stream. The encoding unit 32 supplies the generated encoded stream to the segment file generation unit 33.

At step S44, the segment file generation unit 33 files the encoded stream supplied from the encoding unit 32 for each bit rate to generate the segment file. The segment file generation unit 33 supplies the generated segment file to the upload unit 35. The segment file uploaded to the management server 12 is transmitted to the original distribution server 13 to be stored.

At step S45, the upload unit 35 uploads the segment file supplied from the segment file generation unit 33 to the management server 12. The segment file uploaded to the management server 12 is transmitted to the original distribution server 13 to be stored.

At step S46, the MPD file generation unit 34 integrates the actual bit rate of the audio stream to the held integration value and holds the integration value acquired as a result.

At step S47, the MPD file generation unit 34 determines whether it is integrated up to the actual bit rate of the audio stream at the reproduction time one second before the update time of the MPD file by the process at step S46. Meanwhile, in the example in FIG. 8, since a time until the MPD file the integration value thereof is updated is actually uploaded to the management server 12 is one second, the MPD file generation unit 34 determines whether it is integrated up to the actual bit rate of the audio stream at the reproduction time one second before the update time. However, the time is, of course, not limited to one second, and in a case where this is other than one second, it is determined whether it is integrated up to the actual bit rate of the audio stream at the reproduction time before the update time by that time. Also, the update time of the MPD file in the process at first step S47 is the reference period ΔT after 0 second, and the update time of the MPD file in the process at next step S47 is twice the reference period ΔT after 0 second. Thereafter, similarly, the update time of the MPD file increases by the reference period ΔT.

In a case where it is determined at step S47 that it is integrated up to the actual bit rate of the audio stream at the reproduction time one second before the update time of the MPD file by the process at step S46, the procedure shifts to step S48. At step S48, the MPD file generation unit 34 calculates the average value by dividing the held integration value by the period of the audio stream corresponding to the integrated bit rate.

At step S49, the MPD file generation unit 34 updates AveBandwidth and DurationForAveBandwidth of the MPD file to the information indicating the average value calculated at step S47, and information indicating the period corresponding to the average value, respectively. Then, the MPD file generation unit 34 supplies the updated MPD file to the upload unit 35, and updates the MPD file before updating stored in the management server 12 to the updated MPD file. The management server 12 supplies the updated MPD file to the original distribution server 13 and updates the MPD file before updating stored in the original distribution server 13 to the updated MPD file. Then, the procedure shifts to step S50.

On the other hand, in a case where it is determined at step S47 that it is not yet integrated up to the actual bit rate of the audio stream at the reproduction time one second before the update time of the MPD file by the process at step S46, the procedure shifts to step S50.

At step S50, the acquisition unit 31 determines whether to finish the file generation processing. Specifically, the acquisition unit 31 determines not to finish the file generation processing in a case where the signal of the moving image content in the segment unit is newly supplied. Then, the procedure returns to step S42, and the process at steps S42 to S50 are repeated until it is determined to finish the file generation processing.

On the other hand, in a case where the signal of the moving image content in the segment unit is not newly supplied, the acquisition unit 31 determines to finish the file generation processing at step S50. Then, the procedure ends.

Figure 9:
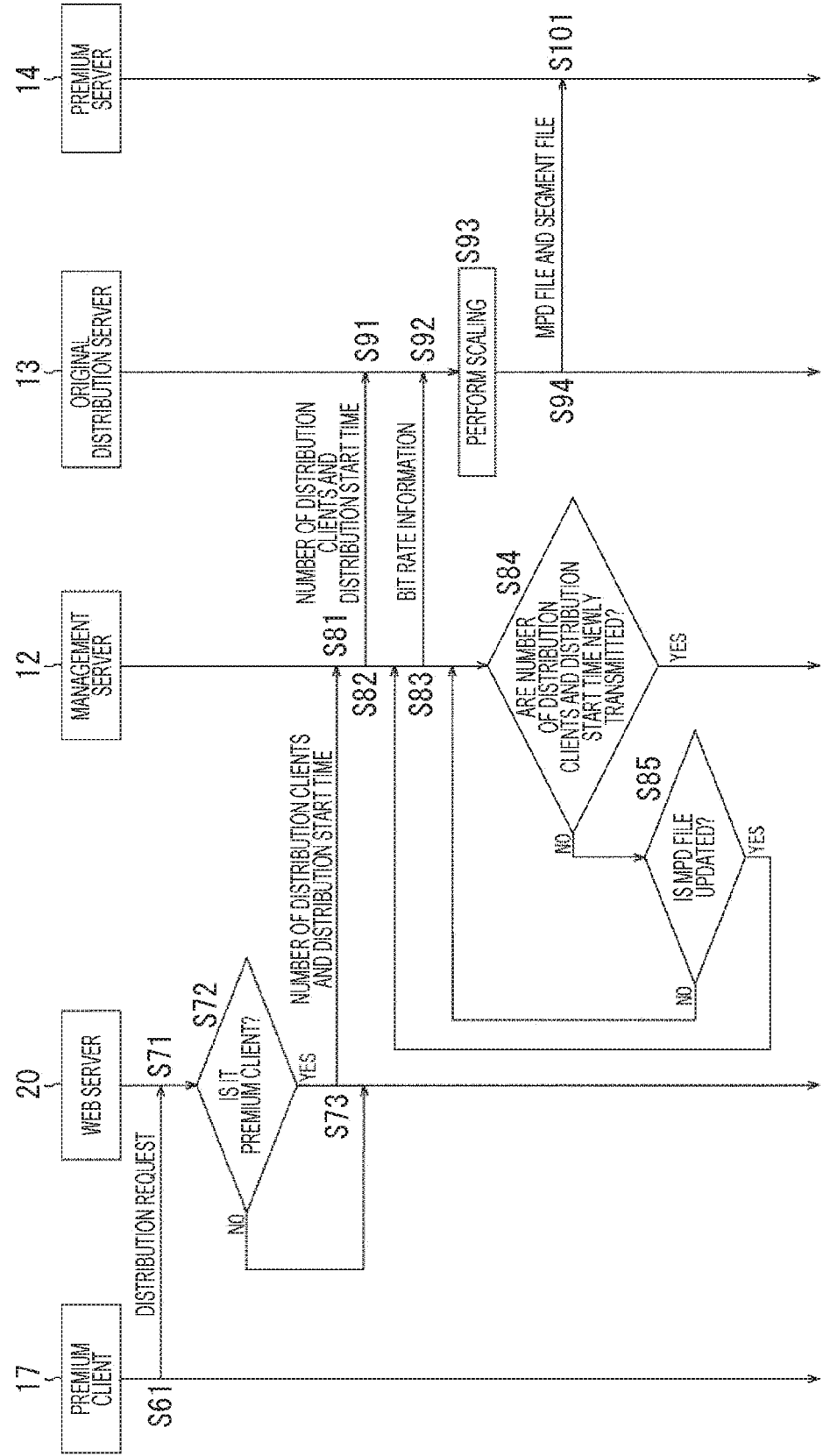
FIG. 9 is a flowchart for illustrating premium distribution preparation processing.

FIG. 9 is a flowchart for illustrating premium distribution preparation processing of the information processing system 10. This premium service distribution preparation processing is performed after the original distribution server 13 prepares the L premium servers 14 from the acquisition start time to the acquisition finish time of the moving image content.

At step S61 in FIG. 9, the premium client 17 transmits a distribution request for requesting to start distributing the moving image content to the web server 20.

At step S71, the web server 20 receives the distribution request transmitted from the premium client 17. At step S72, the web server 20 determines whether the transmission source of the distribution request is the premium client 17 to which the premium license is transmitted at step S25 in FIG. 7. In a case where it is determined that the transmission source of the distribution request is the premium client 17 to which the premium license is transmitted at step S72, the procedure shifts to step S73.

At step S73, the web server 20 increments the held number of distribution clients by one, and holds the current time as the distribution start time of the premium client 17 which transmits the distribution request. The web server 20 transmits to the management server 12 the held number of distribution clients and the distribution start times as many as the number of distribution clients.

At step S81, the management server 12 receives the number of distribution clients and the distribution start times transmitted from the management server 12. At step S82, the management server 12 transmits the received number of distribution clients and distribution start times to the original distribution server 13.

At step S91, the original distribution server 13 receives the number of distribution clients and the distribution start times transmitted from the management server 12.

At step S83, the management server 12 extracts the bit rate information from the stored MPD file and transmits the same to the original distribution server 13.

At step S92, the original distribution server 13 receives the bit rate information transmitted from the management server 12. At step S93, the original distribution server 13 performs the scaling of the L premium servers 14 on the basis of the number of distribution clients, the distribution start times, and the bit rate information.

Specifically, the original distribution server 13 performs the scaling of the L premium servers 14 such that the network bandwidth of the premium client 17 which requests to start distributing and the premium server 14 becomes a bandwidth in which the audio stream of the average value indicated by the bit rate information of maximum Bandwidth may be distributed.

At step S94, the original distribution server 13 transmits the stored MPD file and segment file to (a cache server of) the premium server 14 after the scaling.

At step S101, the premium server 14 after the scaling receives the MPD file and the segment file transmitted from the original distribution server 13 to store.

At step S84, the management server 12 determines whether the number of distribution clients and the distribution start times are newly transmitted from the web server 20, that is, whether new premium distribution preparation processing is started by transmission of a distribution request from the new premium client 17.

In a case where it is determined at step S84 that the number of distribution clients and the distribution start times are not newly transmitted from the web server 20, the procedure shifts to step S85. At step S85, the original distribution server 13 determines whether the stored MPD file is updated. In a case where it is determined at step S85 that the stored MPD file is updated, the procedure returns to step S83 and subsequent processes are repeated.

On the other hand, in a case where it is determined at step S85 that the stored MPD file is not updated, the procedure returns to step S84 and the subsequent processes are repeated. Also, in a case where it is determined at step S84 that the number of distribution clients and the distribution start times are newly transmitted from the web server 20, the procedure ends.

Also, in a case where it is determined at step S72 that the transmission source of the distribution request is not the premium client 17 to which the premium license is transmitted, the procedure ends.

Quasi-premium distribution preparation processing in which the scaling of the quasi-premium server 15 is performed is similar to the premium distribution preparation processing except that this is performed after the M quasi-premium servers 15 are prepared from a lapse of a predetermined time after the acquisition start time of the moving image content to the acquisition finish time, that the premium service is replaced by the quasi-premium service, and except a scaling method. In the quasi-premium distribution preparation processing, for example, the scaling of the M quasi-premium servers 15 is performed such that the network bandwidth of the quasi-premium client 18 which requests to start distributing and the quasi-premium server 15 becomes the bandwidth in which the audio stream of the average value indicated by the bit rate information of predetermined Bandwidth may be distributed.

The on-demand distribution preparation processing in which the scaling of the on-demand service is performed is similar to the premium distribution preparation processing except that this is performed after the N on-demand servers 16 are prepared after the acquisition of the moving image content is finished, that the original distribution server 13 performs the scaling on the basis of the number of distribution clients and the distribution start times without the processes at steps S83, S85, and S92 performed, and that the premium service is replaced by the on-demand service.

Meanwhile, the supposed bandwidth of the premium service is the maximum bit rate. Therefore, the original distribution server 13 may perform the scaling such that the network bandwidth of the premium client 17 which requests to start distributing and the premium server 14 becomes the bandwidth in which the audio stream of the average value indicated by the bit rate information of maximum Bandwidth may be distributed regardless of the number of distribution clients and the distribution start times.

However, the supposed bandwidth of the quasi-premium service is smaller than the maximum bit rate. Therefore, in a case where the supposed bandwidth is not sufficiently larger than the average value indicated by the bit rate information of predetermined Bandwidth, depending on the number of distribution clients and the distribution start times, in the M quasi-premium servers 15, it is not possible to ensure the network bandwidth in which the audio stream of the average value indicated by the bit rate information of predetermined Bandwidth may be distributed with the quasi-premium client 18 which requests to start distributing.

Also, the supposed bandwidth of the on-demand service is the average value indicated by the bit rate information of predetermined Bandwidth, and the number M of the on-demand servers 16 is not the allowable number but the number required for guaranteeing the communication of the audio stream in the supposed bandwidth for the predetermined number of on-demand clients 19. Therefore, depending on the number of distribution clients and the distribution start times, there is a case where it is not possible to ensure the network bandwidth in which the audio stream of the average value indicated by the bit rate information of predetermined Bandwidth may be distributed with the on-demand client 19 who requests to start distributing by the N on-demand servers 16.

As described above, the management server 12 extracts the bit rate information and the maximum bit rate from the MPD file and supplies them to the original distribution server 13. Therefore, the original distribution server 13 may perform the scaling of the premium server 14 and the quasi-premium server 15 on the basis of the bit rate information. As a result, appropriate scaling may be performed as compared with a case in which the scaling is performed on the basis of the maximum bit rate.

Figure 10:
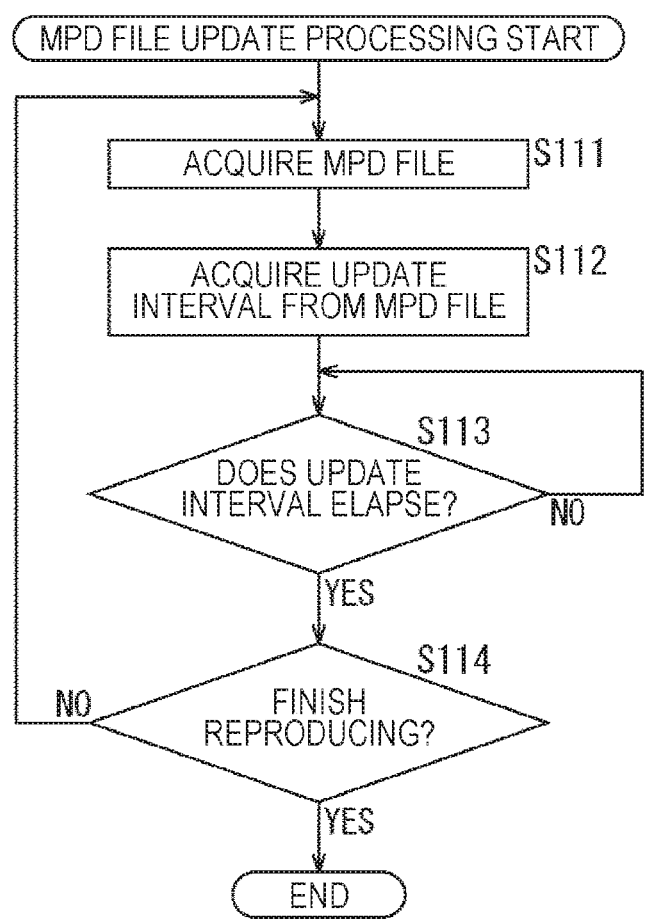
FIG. 10 is a flowchart for illustrating MPD file update processing in the first embodiment.

FIG. 10 is a flowchart for illustrating MPD file update processing of the premium client 17 in FIG. 6. This MPD file update processing is performed in a case where minimumUpdatePeriod is described in the MPD file after the premium distribution preparation processing in FIG. 9.

At step S111 in FIG. 10, the MPD acquisition unit 61 of the premium client 17 requests the premium server 14 to distribute the MPD file on the basis of the premium server information and the premium license supplied from the license acquisition unit 60 and acquires the MPD file. Then, the MPD acquisition unit 61 supplies the acquired MPD file to the MPD processing unit 62.

At step S112, the MPD processing unit 62 acquires the update interval indicated by minimumUpdatePeriod from the MPD file by analyzing the MPD file supplied from the MPD acquisition unit 61.

In addition, the MPD processing unit 62 analyzes the MPD file, thereby acquiring Bandwidth, the acquisition information, the encoding system information and the like of the encoded stream. Furthermore, in a case where the encoding system information indicates that the system is not the fixed system by analyzing the MPD file, the MPD processing unit 62 acquires AveBandwidth of the audio stream and make the same the selection bit rate. In addition, in a case where the encoding system information indicates that the system is the fixed system, the MPD processing unit 62 makes Bandwidth of the audio stream the selection bit rate.

The MPD processing unit 62 supplies Bandwidth and the acquisition information of each video stream, and the selection bit rate, the acquisition information, and the encoding system information of each audio stream to the segment file acquisition unit 63.

At step S113, the MPD acquisition unit 61 determines whether the update interval elapses from the acquisition of the MPD file by the process at previous step S111. In a case where it is determined at step S113 that the update interval does elapse, the MPD acquisition unit 61 stands by until the update interval elapses.

In a case where it is determined at step S113 that the update interval elapses, the procedure shifts to step S114. At step S114, the premium client 17 determines whether to finish reproduction processing in FIG. 11 to be described later. In a case where it is determined at step S114 that the reproduction processing is not finished, the procedure returns to step S111, and the processes at steps S111 to S114 are repeated until the reproduction processing is finished.

On the other hand, in a case where it is determined at step S114 that the reproduction processing is finished, the procedure ends.

As described above, after generating the audio stream, the file generation device 11 calculates the average value of the actual bit rates of the generated audio stream for each reference period and describes the same in the MPD file. Therefore, the premium client 17 needs to periodically acquire and update the MPD file.

Figure 11:
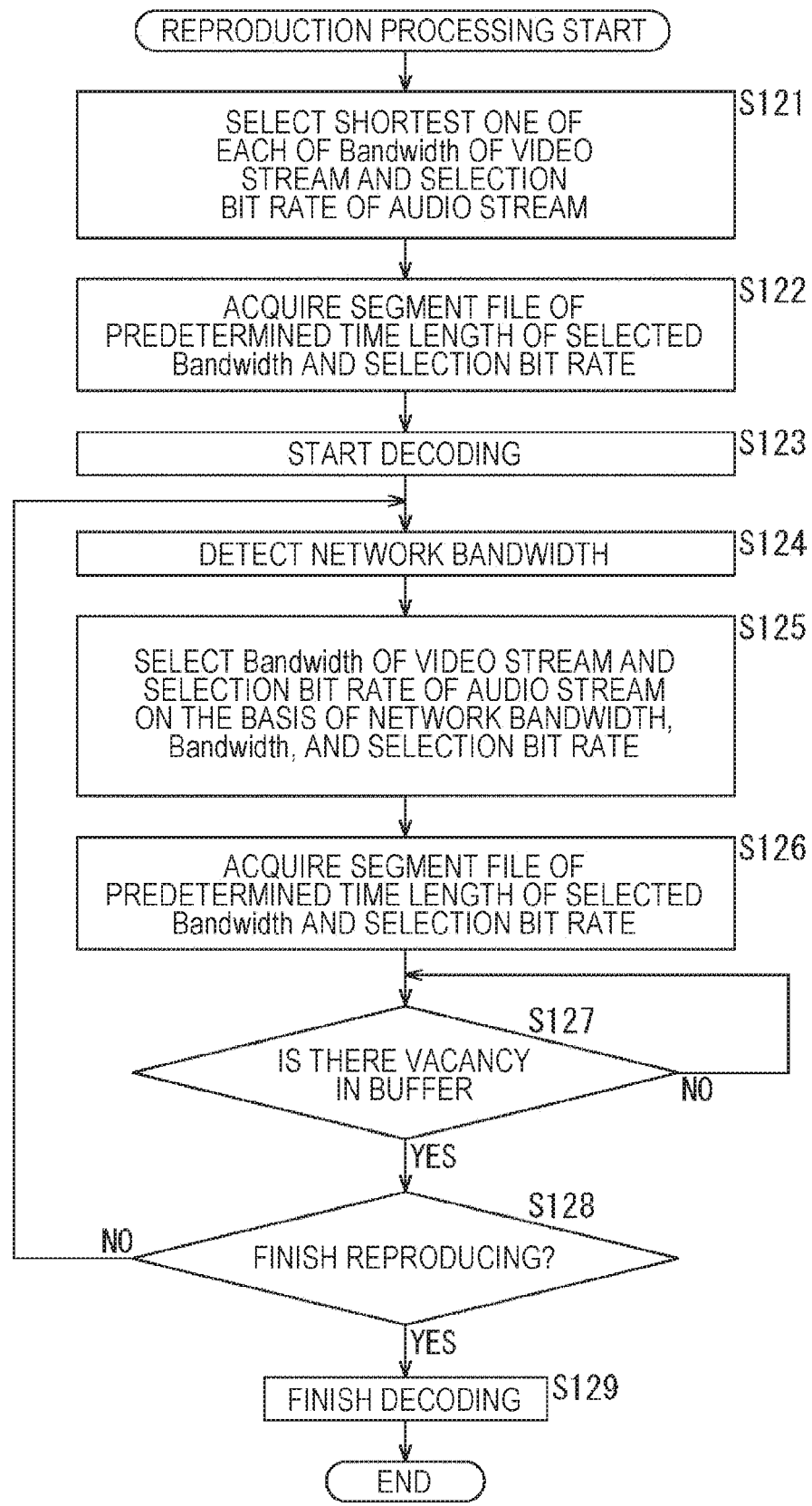
FIG. 11 is a flowchart for illustrating reproduction processing in the first embodiment.

FIG. 11 is a flowchart for illustrating the reproduction processing of the premium client 17 in FIG. 6. This reproduction processing is performed in parallel with the MPD file update processing in FIG. 10.

At step S121 in FIG. 11, the segment file acquisition unit 63 selects smallest Bandwidth of the video stream and the smallest selection bit rate of the audio stream supplied from the MPD processing unit 62.

At step S122, the segment file acquisition unit 63 acquires the segment file in the segment unit from the premium server 14 on the basis of the acquisition information of the segment file of a predetermined time length from the reproduction start time, the premium server information, and the premium license of the segment file of the video stream of Bandwidth and the audio stream of the selection bit rate selected at step S121.

This predetermined time length is the time length of the encoded stream which is desirably stored in the buffer 65 before decoding starts for detecting the network bandwidth between the premium server 14 and the premium client 17. For example, the predetermined time length is 25% of the time length (for example, about 30 seconds to 60 seconds) (hereinafter referred to as the maximum time length) of the encoded stream which may be held in the buffer 65. The segment file acquisition unit 63 supplies the acquired segment file to the buffer 65 to be held.

At step S125, the segment file acquisition unit 63 selects Bandwidth of the video stream and the selection bit rate of the audio stream on the basis of the network bandwidth between the premium server 14 and the premium client 17, Bandwidth of the video stream, and the selection bit rate of the audio stream.

Specifically, the segment file acquisition unit 63 selects Bandwidth of the video stream and the selection bit rate of the audio stream such that the sum of Bandwidth of the video stream and the selection bit rate of the audio stream which are selected is not larger than the network bandwidth.

At step S126, the segment file acquisition unit 63 transmits the acquisition information of the segment file of a predetermined time length from time next to the segment file acquired at step S122 out of the segment file of the video stream of Bandwidth and the audio stream of the selection bit rate selected at step S125 to the premium server 14 in the segment unit and acquires the segment file in the segment unit. The segment file acquisition unit 63 supplies the acquired segment file to the buffer 65 to be held.

Meanwhile, since AveBandwidth is the average value of the actual bit rates of the audio stream, the actual bit rate might exceed AveBandwidth in some cases. Therefore, the predetermined time length at step S126 is made shorter than the reference period $\Delta T$. As a result, in a case where the actual bit rate exceeds AveBandwidth, the network bandwidth becomes smaller and the audio stream at a lower selection bit rate is acquired. As a result, overflow of the buffer 65 may be prevented.

At step S127, the segment file acquisition unit 63 determines whether there is vacancy in the buffer 65. In a case where it is determined at step S127 that there is no vacancy in the buffer 65, the segment file acquisition unit 63 stands by until vacancy occurs in the buffer 65.

On the other hand, in a case where it is determined at step S127 that there is the vacancy in the buffer 65, the premium client 17 determines whether to finish reproduction at step S128. In a case where it is determined at step S128 that the reproduction is not finished, the procedure returns to step S124 and the processes at steps S124 to S128 are repeated until the reproduction is finished.

On the other hand, in a case where it is determined at step S128 that the reproduction is finished, at step S129, the decoding unit 66 finishes decoding after the decoding of all the encoded streams stored in the buffer 65 is finished. Then, the procedure ends.

Meanwhile, the original distribution server 13 may perform the scaling such that the network bandwidth between the premium client 17 which requests to start distributing and the premium server 14 becomes the bandwidth in which the audio stream of the average value indicated by the bit rate information of maximum Bandwidth may be distributed regardless of the number of distribution clients and the distribution start times. Therefore, according to the reproduction processing in FIG. 11, the premium client 17 may continuously acquire the audio stream having same Bandwidth.

Also, although not described, the MPD file update processing and the reproduction processing of the quasi-premium client 18 are basically the same as the MPD file update processing in FIG. 10 and the reproduction processing in FIG. 11.

However, as described above, in a case where the supposed bandwidth is not sufficiently larger than the average value indicated by the bit rate information of predetermined Bandwidth, depending on the number of distribution clients and the distribution start times, it is not possible to ensure the network bandwidth in which the audio stream of the average value indicated by the bit rate information of predetermined Bandwidth may be distributed with the quasi-premium client 18 which requests to start distributing by the M quasi-premium servers 15. Therefore, in this case, the quasi-premium client 18 continuously acquires the audio stream having the same maximum bit rate by changing the time length of the encoded stream to be held in the buffer 65 according to the network bandwidth.

In addition, the on-demand client 19 acquires the MPD file after the acquisition of the moving image content is finished. Therefore, the acquired MPD file already includes the average value of the entire period of the moving image content. Therefore, the on-demand client 19 does not perform the MPD file update processing. The reproduction processing of the on-demand client 19 is basically the same as the reproduction processing in FIG. 11.

However, depending on the number of distribution clients and the distribution start times, there is a case where it is not possible to ensure the network bandwidth in which the audio stream of the average value indicated by the bit rate information of predetermined Bandwidth may be distributed with the on-demand client 19 which requests to start distributing by the N on-demand servers 16. Therefore, in this case, the on-demand client 19 changes Bandwidth corresponding to the audio stream to be acquired by the reproduction processing. Meanwhile, in this case also, the on-demand client 19 may continuously acquire the audio stream having same bandwidth by changing the time length of the encoded stream held in the buffer 65 according to the network bandwidth.

As described above, the file generation device 11 generates the average value of the actual bit rates of the audio stream encoded by the lossless DSD system. Therefore, the premium client 17, the quasi-premium client 18, and the on-demand client 19 may select Bandwidth of the video stream to be acquired on the basis of the average value of the actual bit rates of the audio stream, thereby allocating at least a part of a surplus bandwidth which is a difference between Bandwidth of the audio stream and the actual bit rate to the video stream. As a result, it is possible to acquire the video stream at an optimal bit rate as compared with a case of selecting Bandwidth of the video stream to be acquired on the basis of Bandwidth of the audio stream.

Also, since the file generation device 11 updates AveBandwidth of the MPD file every reference period, the premium client 17, the quasi-premium client 18, and the on-demand client 19 may acquire the latest MPD file at the distribution start time, thereby acquiring latest AveBandwidth.

(Description of Service)

FIG. 12 is a view for illustrating the above-described premium service, quasi-premium service, and on-demand service.

As illustrated in FIG. 12, the supposed bandwidth of the premium service is the maximum bit rate. In addition, in the premium service, the L premium servers 14 required for guaranteeing the supposed bandwidth to the allowable number of premium clients 17 are prepared. Therefore, a distribution cost per premium client 17 is the highest. In addition, the allowable number of premium clients 17 depends on the number of premium servers 14 that can be prepared and is generally small.

In addition, by preparing the L premium servers 14, the premium client 17 which reproduces the moving image content distributed by the premium service may reproduce the audio stream at the bit rate of same Bandwidth from the reproduction start time to reproduction finish time.

Furthermore, in the premium service, the reproduction may be started at the same time as the acquisition start time of the moving image content, and there is no need to change Bandwidth of the audio stream to be reproduced during the reproduction, so that the value of the moving image content is highest. As described above, in the premium service, the value of the moving image content is high and the distribution cost is high, so that the fee is the highest.

In addition, in the premium service, the distribution of the moving image content is permitted only during the period from the acquisition start time to the acquisition finish time of the moving image content, and the distribution by the on-demand service cannot be performed.

On the other hand, the supposed bandwidth of the quasi-premium service is the bit rate smaller than the maximum bit rate determined on the basis of the bit rate information of predetermined Bandwidth from the acquisition start time of the moving image content to the time when the distribution by the quasi-premium service is permitted, and the maximum bit. In addition, in the quasi-premium service, the M quasi-premium servers 15 required for guaranteeing the supposed bandwidth to the allowable number of quasi-premium clients 18 are prepared.

Therefore, the distribution cost per one quasi-premium client 18 is lower than that of the premium service. Also, the longer a time from the acquisition start time of the moving image content to the time when the distribution by the quasi-premium service is permitted, the more the guaranteed network bandwidth approaches the actual bit rate of the audio stream.

Also, in the quasi-premium service, in a case where the supposed bandwidth is not sufficiently larger than the average value indicated by the bit rate information of predetermined Bandwidth, in order to reproduce the audio stream Bandwidth of which is the same from the reproduction start time to the reproduction finish time, the quasi-premium client 18 needs to change the time length of the encoded stream to be held in the buffer 65 according to the network bandwidth.

Therefore, in a case where the original distribution server 13 makes the supposed bandwidth relatively larger than the average value indicated by the bit rate information of predetermined Bandwidth, the allowable number of quasi-premium clients 18 depends on the number of quasi-premium servers 15 that can be prepared, and this is generally not large. Also, in a case where the quasi-premium client 18 changes the time length of the encoded stream to be held by in the buffer 65 according to the network bandwidth, the allowable number of quasi-premium clients 18 depends on processing ability of the quasi-premium client 18, and this is generally not small.

Also, in the quasi-premium service, since the reproduction cannot be started before a predetermined time elapses from the acquisition start time of the moving image content, so that the value of the moving image content is lower than that in the premium service. As described above, in the quasi-premium service, the value and the distribution cost of the moving image content are lower than those in the premium service, so that the fee is lower than that in the premium service.

In the quasi-premium service, the distribution of the moving image content is permitted only during the period from a predetermined time after the acquisition start time of the moving image content to the acquisition finish time, and the distribution by the on-demand service cannot be performed.

The supposed bandwidth of the on-demand service is the average value of the actual bit rates indicated by the bit rate information of predetermined Bandwidth. Meanwhile, the supposed bandwidth of the on-demand service may also be a fixed value smaller than the maximum bit rate determined in advance. Also, in the on-demand service, the N on-demand servers 16 required for guaranteeing the supposed bandwidth to the predetermined number of on-demand clients 19 are prepared. Therefore, the distribution cost per one on-demand client 19 is the lowest.

Also, in the on-demand service, it might be necessary to change Bandwidth of the audio stream to be reproduced from the reproduction start time to the reproduction finish time in some cases. In this case, the quasi-premium client 18 changes the time length of the encoded stream to be held in the buffer 65 according to the network bandwidth, thereby reproducing the audio stream of same Bandwidth or changing Bandwidth of the audio stream to be reproduced. Therefore, the allowable number of on-demand clients 19 depends on processing ability of the on-demand client 19 and is generally large.

Furthermore, in the on-demand service, the reproduction cannot be started before the acquisition of the moving image content is finished, and it might be required to change Bandwidth of the audio stream to be reproduced during the reproduction, so that the value of the moving image content is the lowest. As described above, in the on-demand service, the value and the distribution cost of the moving image content are the lowest, so that the fee is the lowest.

Meanwhile, the original distribution server 13 may perform the scaling of the on-demand server 16 by a normal cache server scaling method. In this case, the bandwidth is not guaranteed.

Second Embodiment (Configuration Example of Media Segment File of Audio Stream)

A second embodiment of an information processing system to which the present disclosure is applied is different from the first embodiment mainly in that minimumUpdatePeriod is not described in an MPD file but update notification information notifying of update time of the MPD file is stored in a media segment file of an audio stream. Therefore, only the segment file of the audio stream, file generation processing, MPD file update processing, and reproduction processing are hereinafter described.

Figure 13:
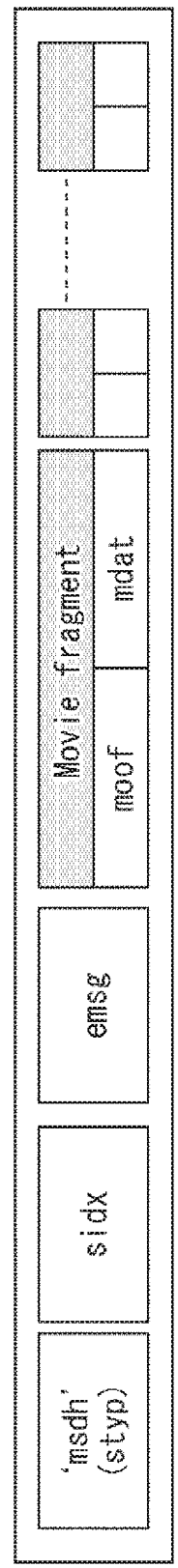
FIG. 13 is a view illustrating a configuration example of a media segment file in a second embodiment.

FIG. 13 is a view illustrating a configuration example of the media segment file including the update notification information of the audio stream in the second embodiment.

The media segment file (Media Segment) in FIG. 13 includes a styp box, a sidx box, an emsg box (Event Message Box), and one or more Movie fragments.

The styp box is a box which stores information indicating a format of the media segment file. In the example in FIG. 13, msdh indicating that the format of the media segment file is an MPEG-DASH format is stored in the styp box. The sidx box is a box which stores index information of a sub segment including one or more Movie fragments.

The emsg box is a box which stores the update notification information by using MPD validity expiration. The Movie fragment includes a moof box and a mdat box. The moof box is a box which stores metadata of the audio stream, and the mdat box is a box which stores the audio stream. The Movie fragments forming Media Segment are divided into one or more sub segments.

(Description Example of emsg Box)

FIG. 14 is a view illustrating a description example of the emsg box in FIG. 13.

As illustrated in FIG. 14, string value, presentation_time_delta, event_duration, id, message_data and the like are described in the emsg box.

Being a value which defines an event corresponding to this emsg box, string value is set to 1 indicating update of the MPD file in a case in FIG. 14.

It is a time from reproduction time of the media segment file in which this emsg box is arranged to reproduction time when the event is performed, presentation_time_delta is. Therefore, in the case in FIG. 14, presentation_time_delta is the time from the reproduction time of the media segment file in which this emsg box is arranged to the reproduction time when the MPD file is updated, and is the update notification information. In the second embodiment, presentation_time_delta is set to 5. Therefore, the MPD file is updated five seconds after the reproduction time of the media segment file in which this emsg box is arranged.

Being a period of the event corresponding to this emsg box, event_duration is set to "0xFFFF" indicating that the period is unknown in the case in FIG. 14. id is an ID unique to this emsg box. In addition, message_data is data regarding the event corresponding to this emsg box, and in the case in FIG. 14, this is Extensible Markup Language (XML) data of the update time of the MPD file.

As described above, a file generation device 11 includes the emsg box in FIG. 14 which stores presentation_time_delta in the media segment file of the audio stream as necessary. As a result, the file generation device 11 may notify a device on a subsequent stage such as a management server 12 how many seconds it takes for the MPD file to be updated after the reproduction time of the media segment file.

In addition, the file generation device 11 may easily change an update frequency of the MPD file only by changing a frequency of arranging the emsg box in the media segment file.

(Description of Processing of File Generation Device)

Figure 15:
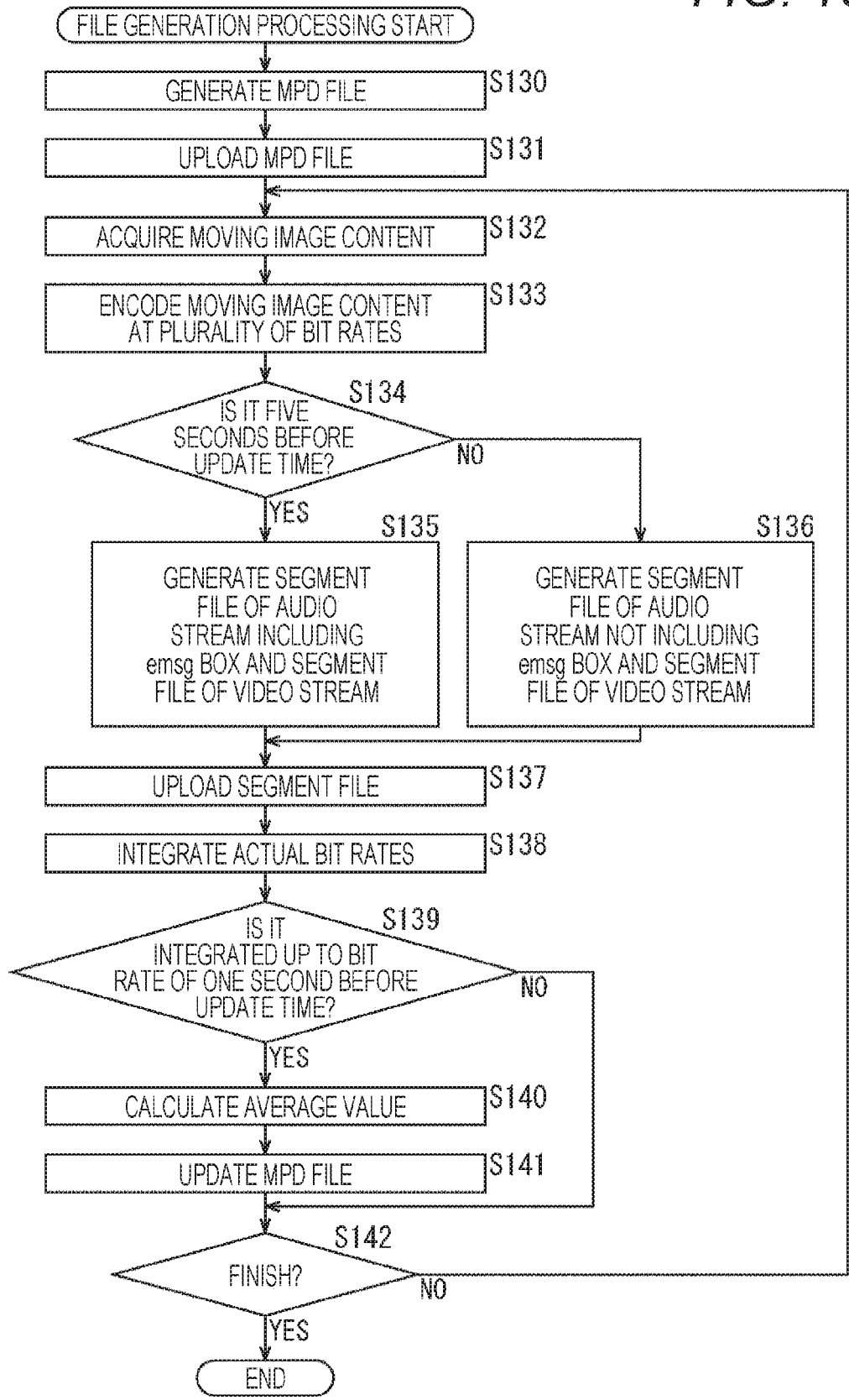
FIG. 15 is a flowchart for illustrating file generation processing in the second embodiment.

FIG. 15 is a flowchart for illustrating the file generation processing of the file generation device 11 in the second embodiment. This file generation processing is performed in a case where at least one of the encoding systems of the audio stream is the lossless DSD system.

At step S130 in FIG. 15, an MPD file generation unit 34 of the file generation device 11 generates the MPD file. This MPD file is different from the MPD file in the first embodiment in that minimumUpdatePeriod is not described and that "urn:mpeg:dash:profile:is-off-ext-live:2014" is described. "urn:mpeg:dash:profile:is-off-ext-live:2014" is a profile indicating that the emsg box in FIG. 14 is arranged in the media segment file. The MPD file generation unit 34 supplies the generated MPD file to the upload unit 35.

Processes at steps S131 to S133 are similar to processes at steps S41 to S43 in FIG. 8, respectively, so that the description thereof is not repeated.

At step S134, a segment file generation unit 33 of the file generation device 11 determines whether reproduction time of an audio digital signal encoded at step S133 is five seconds before the update time of the MPD file. Meanwhile, in the example in FIG. 15, the segment file generation unit 33 determines whether it is five seconds before the update time of the MPD file because the device on the subsequent stage is notified of the update of the MPD file five seconds before. However, the device on the subsequent stage may of course be notified a time other than five seconds before, and in a case where this is performed a time other than five seconds before, it is determined whether it is before the update time of the MPD file by that time. Also, the update time of the MPD file in the process at first step S134 is a reference period ΔT after 0 second, and the update time of the MPD file in the process at next step S134 is twice the reference period ΔT after 0 second. Thereafter, similarly, the update time of the MPD file increases by the reference period ΔT.

In a case where it is determined at step S134 that it is five seconds before the update time of the MPD file, the procedure shifts to step S135. At step S135, the segment file generation unit 33 generates the segment file of the audio stream supplied from an encoding unit 32 including the emsg box in FIG. 14. The segment file generation unit 33 also generates a segment file of a video stream supplied from the encoding unit 32. Then, the segment file generation unit 33 supplies the generated segment file to the upload unit 35, and shifts the procedure to step S137.

On the other hand, in a case where it is determined at step S134 that it is not five seconds before the update time of the MPD file, the procedure shifts to step S136. At step S136, the segment file generation unit 33 generates the segment file of the audio stream supplied from the encoding unit 32 not including the emsg box in FIG. 14. The segment file generation unit 33 also generates a segment file of a video stream supplied from the encoding unit 32. Then, the segment file generation unit 33 supplies the generated segment file to the upload unit 35, and shifts the procedure to step S137.

Processes at steps S137 to S142 are the same as processes at steps S45 to S50 in FIG. 8, respectively, so that description thereof is not repeated.

Meanwhile, although not illustrated, the MPD file update processing of a premium client 17 in the second embodiment is the processing in which an MPD acquisition unit 61 acquires the MPD file five seconds after when the emsg box in FIG. 14 is included in the media segment file acquired by the segment file acquisition unit 63. In the second embodiment, presentation_time_delta is set to 5, but of course this is not limited to this.

Also, the reproduction processing of the premium client 17 in the second embodiment is the same as the reproduction processing in FIG. 11 and is performed in parallel with the MPD file update processing. A relationship between the MPD file update processing and reproduction processing of the premium client 17 and the MPD file update processing and reproduction processing of a quasi-premium client 18, and a relationship between the reproduction processing of the premium client 17 and the reproduction processing of an on-demand client 19 are the same as the relationships in the first embodiment. Also, in the second embodiment, the on-demand client 19 performs the MPD file update processing as is the case with the premium client 17, but the MPD file does not change before and after the update.

As described above, in the second embodiment, the emsg box which stores the update notification information is arranged in the media segment file. Therefore, the management server 12 only has to extract bit rate information included in the MPD file in a case of acquiring the media segment file including the emsg box.

In addition, the premium client 17, the quasi-premium client 18, and the on-demand client 19 only have to acquire the MPD file in a case of acquiring the media segment file including the emsg box. Therefore, it is possible to suppress an increase in HTTP overhead other than when acquiring the encoded stream.

Third Embodiment (Description Example of emsg Box)

A third embodiment of an information processing system to which the present disclosure is applied is different from the second embodiment mainly in that an MPD file is not updated but an emsg box which stores update values of AveBandwidth and DurationForAveBandwidth as update information (difference information before and after update) of the MPD file is arranged in a segment file of an audio stream, and that a management server 12 extracts the MPD file and bit rate information included in the emsg box.

That is, in the third embodiment, initial values of AveBandwidth and DurationForAveBandwidth are included in the MPD file, and the updated values of AveBandwidth and DurationForAveBandwidth are included in the segment file of the audio stream. Therefore, only the emsg box which stores the update values of AveBandwidth and DurationForAveBandwidth, file generation processing, MPD file update processing, and reproduction processing are hereinafter described.

FIG. 16 is a view illustrating a description example of the emsg box which stores the update values of AveBandwidth and DurationForAveBandwidth in the third embodiment.

In the emsg box in FIG. 16, string value is set to 2 indicating transmission of the update information of the MPD file. Also, in presentation_time_delta, 0 is set as a time from reproduction time of a media segment file in which this emsg box is arranged to reproduction time when the update information of the MPD file is transmitted. As a result, a device on a subsequent stage may recognize that the update information of the MPD file is arranged in the media segment file in which this emsg box is arranged.

As is the case in FIG. 14, event_duration is set to "0xFFFF". Also, message_data is XML data of the updated values of AveBandwidth and DurationForAveBandwidth which are the update information of the MPD file.

(Description of Processing of File Generation Device)

Figure 17:
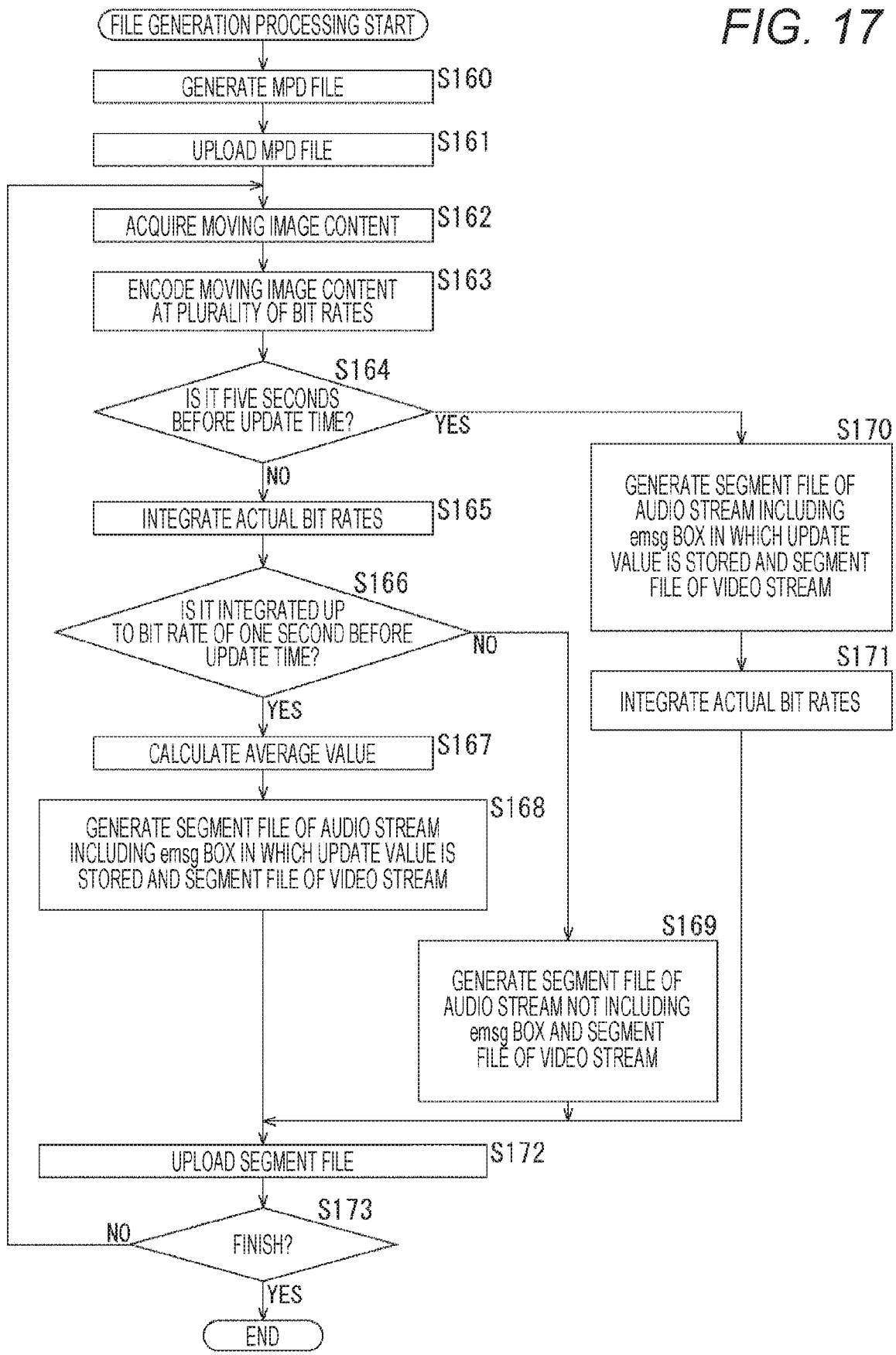
FIG. 17 is a flowchart for illustrating file generation processing in the third embodiment.

FIG. 17 is a flowchart for illustrating the file generation processing of a file generation device 11 in the third embodiment. This file generation processing is performed in a case where at least one of the encoding systems of the audio stream is the lossless DSD system.

At step S160 in FIG. 17, an MPD file generation unit 34 of the file generation device 11 generates the MPD file. This MPD file is the same as the MPD file in the second embodiment except that a profile is replaced by a profile indicating that the emsg box in FIG. 14 or FIG. 16 is arranged in the media segment file. The MPD file generation unit 34 supplies the generated MPD file to the upload unit 35.

Processes at steps S161 to S164 are similar to processes at steps S131 to S134 in FIG. 15, respectively, so that the description thereof is not repeated.

In a case where it is determined at step S164 that it is not five seconds before update time of the MPD file, the procedure shifts to step S165. Processes at steps S165 to S167 are similar to processes at steps S138 to S140 in FIG. 15, respectively, so that the description thereof is not repeated.

At step S168, a segment file generation unit 33 generates the segment file of the audio stream supplied from an encoding unit 32 including the emsg box in FIG. 16 including an average value calculated at step S167 as the update value of AveBandwidth and including a period corresponding to the average value as the update value of DurationForAveBandwidth. The segment file generation unit 33 also generates a segment file of a video stream supplied from the encoding unit 32. Then, the segment file generation unit 33 supplies the generated segment file to the upload unit 35 and shifts the procedure to step S172.

On the other hand, in a case where it is determined at step S166 that it is not yet integrated up to an actual bit rate of the audio stream at the reproduction time one second before the update time of the MPD file, the procedure shifts to step S169.

At step S169, the segment file generation unit 33 generates the segment file of the audio stream supplied from the encoding unit 32 not including the emsg box in FIG. 14 and the emsg box in FIG. 16. The segment file generation unit 33 also generates a segment file of a video stream supplied from the encoding unit 32. Then, the segment file generation unit 33 supplies the generated segment file to the upload unit 35 and shifts the procedure to step S172.

On the other hand, in a case where it is determined at step S164 that it is five seconds before the update time, the segment file generation unit 33 generates the segment file of the audio stream supplied from the encoding unit 32 including the emsg box which stores update notification information in FIG. 14 at step S170. The segment file generation unit 33 also generates a segment file of a video stream supplied from the encoding unit 32. Then, the segment file generation unit 33 supplies the generated segment file to the upload unit 35.

At step S171, the MPD file generation unit 34 integrates the actual bit rate of the audio stream to a held integration value and holds an integration value acquired as a result, and shifts the procedure to step S172.

At step S172, the upload unit 35 uploads the segment file supplied from the segment file generation unit 33 to the management server 12.

A process at step S173 is similar to the process at step S142 in FIG. 15, so that the description thereof is not repeated.

Meanwhile, although not illustrated, the MPD file update processing of a premium client 17 in the third embodiment is the processing of acquiring the update values of AveBandwidth and DurationForAveBandwidth from the emsg box in FIG. 16 of the media segment file five seconds after to update the MPD file when the emsg box in FIG. 14 is included in the media segment file acquired by the segment file acquisition unit 63.

Also, the reproduction processing of the premium client 17 in the third embodiment is the same as the reproduction processing in FIG. 11 and is performed in parallel with the MPD file update processing. A relationship between the MPD file update processing and reproduction processing of the premium client 17 and the MPD file update processing and reproduction processing of a quasi-premium client 18 and an on-demand client 19 are the same as the relationship in the first embodiment.

As described above, in the third embodiment, only the updated values of AveBandwidth and DurationForAveBandwidth are transmitted to the device on the subsequent stage. Therefore, it is possible to reduce a transmission amount required for updating AveBandwidth and DurationForAveBandwidth. In addition, since the management server 12 and an MPD processing unit 62 only have to analyze the description regarding AveBandwidth and DurationForAveBandwidth as for the updated MPD file, an analysis load is reduced.

Also, in the third embodiment, the updated values of AveBandwidth and DurationForAveBandwidth are stored in the segment file of the audio stream. Therefore, the premium client 17, the quasi-premium client 18, and the on-demand client 19 need not acquire the MPD file each time the MPD file is updated. Therefore, it is possible to suppress an increase in HTTP overhead other than when acquiring the encoded stream.

Fourth Embodiment (Description Example of emsg Box)

A fourth embodiment of an information processing system to which the present disclosure is applied is different from the third embodiment mainly in that initial values of AveBandwidth and DurationForAveBandwidth are not described in an MPD file, an emsg box which stores update notification information is not arranged in a segment file of an audio stream, and a management server 12 extracts bit rate information included in the emsg box. Therefore, only the emsg box which stores AveBandwidth and DurationForAveBandwidth, file generation processing, update processing of AveBandwidth and DurationForAveBandwidth, and reproduction processing are hereinafter described.

FIG. 18 is a view illustrating a description example of the emsg box which stores AveBandwidth and DurationForAveBandwidth in the fourth embodiment.

In the emsg box in FIG. 18, string value is set to 3 which indicates transmission of AveBandwidth and DurationForAveBandwidth. Also, in presentation_time_delta, 0 is set as a time from reproduction time of a media segment file in which this emsg box is arranged to reproduction time at which AveBandwidth and DurationForAveBandwidth are transmitted. As a result, a device on a subsequent stage may recognize that AveBandwidth and DurationForAveBandwidth the are arranged in the media segment file in which the emsg box is arranged.

As is the case in FIG. 14, event_duration is set to "0xFFFF". Also, message_data is XML data of AveBandwidth and DurationForAveBandwidth.

A file generation device 11 may easily change an update frequency of AveBandwidth and DurationForAveBandwidth only by changing an arrangement frequency of the emsg box in FIG. 18 to the media segment file of the audio stream.

Meanwhile, although not illustrated, the file generation processing of the file generation device 11 in the fourth embodiment is similar to the file generation processing in FIG. 17, mainly except that processes at steps S164, S170, and S171 are not performed, and that the emsg box in FIG. 16 is replaced by the emsg box in FIG. 18.

However, AveBandwidth and DurationForAveBandwidth are not described in the MPD file in the fourth embodiment. Also, a profile described in the MPD file is the profile indicating that emsg in FIG. 18 is arranged in the segment file, and is, for example, "urn:mpeg:dash:profile:isoff-dynamic-bandwidth:2015".

Also, although not illustrated, the update processing of AveBandwidth and DurationForAveBandwidth of a premium client 17 in the fourth embodiment is performed in place of the MPD file update processing in the third embodiment. The update processing of AveBandwidth and DurationForAveBandwidth is processing of, when the emsg box in FIG. 18 is included in the media segment file acquired by a segment file acquisition unit 63, acquiring AveBandwidth and DurationForAveBandwidth from the emsg box, and updating AveBandwidth and DurationForAveBandwidth.

Also, the reproduction processing of the premium client 17 in the fourth embodiment is the same as the reproduction processing in FIG. 11 except that AveBandwidth of a selection bit rate at step S121 is not supplied from an MPD processing unit 62 but updated by the segment file acquisition unit 63 itself. This reproduction processing is performed in parallel with the update processing of AveBandwidth and DurationForAveBandwidth.

A relationship between the update processing and reproduction processing of AveBandwidth and DurationForAveBandwidth of the premium client 17 and the update processing and reproduction processing of AveBandwidth and DurationForAveBandwidth of a quasi-premium client 18 and an on-demand client 19 is the same as that in the first embodiment.

As described above, in the fourth embodiment, AveBandwidth and DurationForAveBandwidth are arranged in the emsg box. Therefore, the management server 12 and the MPD processing unit 62 need not analyze the MPD file for AveBandwidth and DurationForAveBandwidth.

Meanwhile, AveBandwidth and DurationForAveBandwidth may also be periodically transmitted in compliance with other standards such as HTTP 2.0 and WebSocket, instead of being stored in the emsg box. In this case also, the effect similar to that of the fourth embodiment is acquired.

Also, in the fourth embodiment, the emsg box which stores the update notification information may be arranged in the segment file as in the second embodiment.

Fifth Embodiment (Description Example of MPD File)

A fifth embodiment of an information processing system to which the present disclosure is applied is different from the fourth embodiment mainly in that XML data of AveBandwidth and DurationForAveBandwidth is arranged in a segment file different from the segment file of an audio stream, and a management server 12 extracts bit rate information included in the segment file. Therefore, only the segment file which stores AveBandwidth and DurationForAveBandwidth (hereinafter, referred to as a bandwidth segment file), file generation processing, update processing of AveBandwidth and DurationForAveBandwidth, and reproduction processing are hereinafter described.

Figure 19:
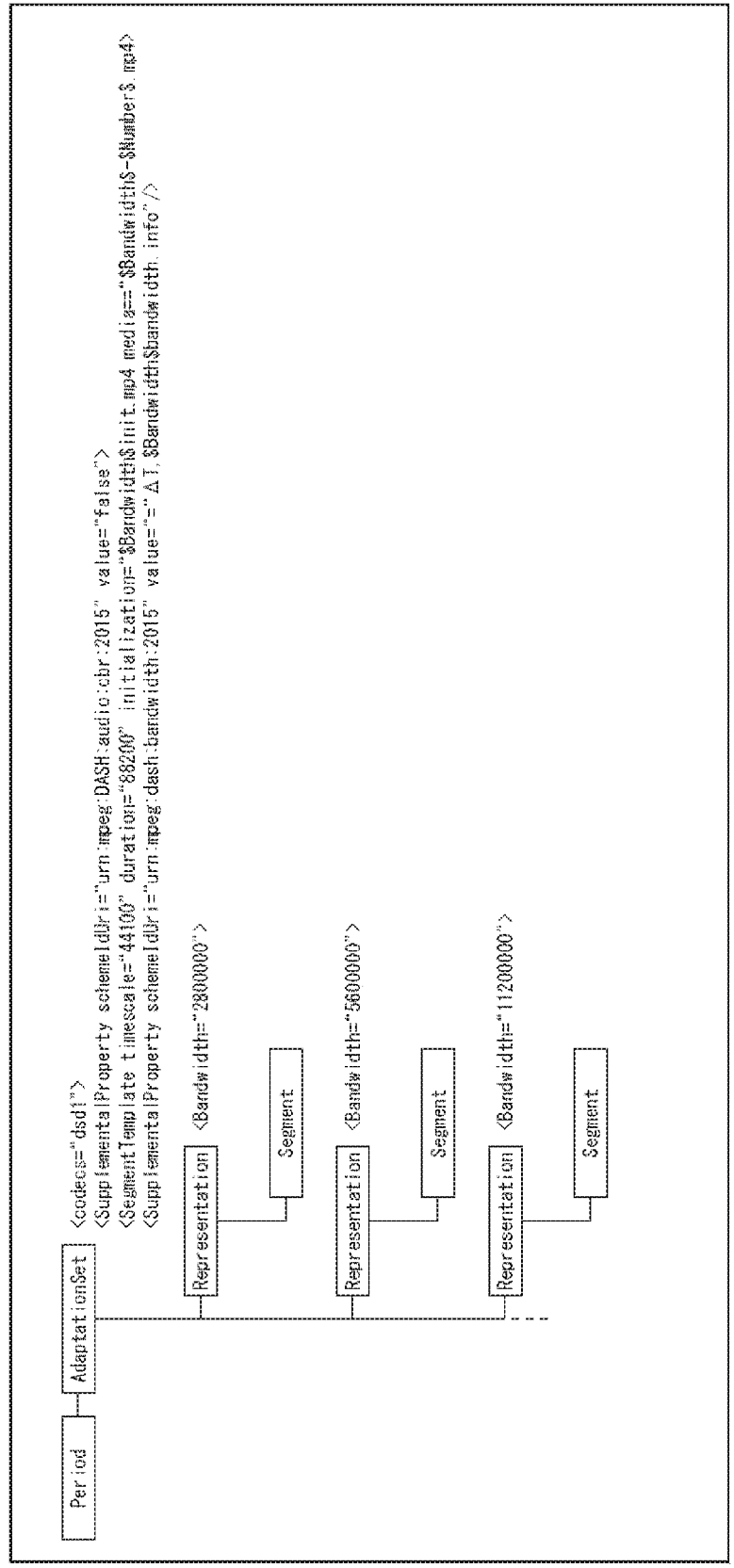
FIG. 19 is a view illustrating a description example of an MPD file in a fifth embodiment.

FIG. 19 is a view illustrating a description example of an MPD file in the fifth embodiment.

Meanwhile, in FIG. 19, for convenience of description, only description to manage the bandwidth segment file in the description of the MPD file is illustrated.

As illustrated in FIG. 19, an adaptation set element of the bandwidth segment file is different from the adaptation set element of the audio stream in FIG. 4 in including <SupplementalProperty schemeIdUri="urn:mpeg:dash:bandwidth:2015">.

<SupplementalProperty schemeIdUri="urn:mpeg:dash:bandwidth:2015"> is a descriptor indicating an update interval of the bandwidth segment file. As a value (value) of <SupplementalProperty schemeIdUri="urn:mpeg:dash:bandwidth:2015">, the update interval and a file URL which is a base of a name of the bandwidth segment file are set. In the example in FIG. 19, the update interval is set to a reference period ΔT, and the file URL is set to "$Bandwidth-$bandwidth.info". Therefore, the base of the name of the bandwidth segment file is acquired by adding "bandwidth" to Bandwidth included in a representation element.

Also, in the example in FIG. 19, maximum bit rates of three types of audio streams corresponding to the bandwidth segment file are 2.8 Mbps, 5.6 Mbps, and 11.2 Mbps. Therefore, the three representation elements include 2800000, 5600000, 11200000 as Bandwidth. Therefore, in the example in FIG. 19, the base of the name of the bandwidth segment file is 2800000bandwidth.info, 5600000bandwidth.info, and 11200000 bandwidth.info.

A segment info element included in the representation element includes information regarding each bandwidth segment file of a bandwidth segment file group corresponding to the representation.

As described above, in the fifth embodiment, the update interval is described in the MPD file. Therefore, by only changing the update interval described in the MPD file and the update interval of the bandwidth segment file, it is possible to easily change the update frequency of AveBandwidth and DurationForAveBandwidth.

Meanwhile, although not illustrated, the file generation processing of a file generation device 11 in the fifth embodiment is similar to the file generation processing in FIG. 8 except that the MPD file generated at step S40 is the MPD file in FIG. 19, and that a segment file generation unit 33 generates the bandwidth segment file and this is uploaded to the management server 12 via an upload unit 35 without the MPD file updated at step S49.

Also, the update processing of AveBandwidth and DurationForAveBandwidth in a premium client 17 in the fifth embodiment is similar to the MPD file update processing in FIG. 10 except that a segment file acquisition unit 63 acquires the bandwidth segment file between steps S93 and S94 to update AveBandwidth and DurationForAveBandwidth, and that the procedure returns to step S93 in a case where it is determined not to finish at step S94.

Furthermore, the reproduction processing of the premium client 17 in the fifth embodiment is the same as the reproduction processing in FIG. 11 except that AveBandwidth of a selection bit rate at step S121 is not supplied from an MPD processing unit 62 but updated by the segment file acquisition unit 63 itself. This reproduction processing is performed in parallel with the update processing of AveBandwidth and DurationForAveBandwidth.

A relationship between the update processing and reproduction processing of AveBandwidth and DurationForAveBandwidth of the premium client 17 and the update processing and reproduction processing of AveBandwidth and DurationForAveBandwidth of a quasi-premium client 18 and an on-demand client 19 is the same as that in the first embodiment.

As described above, in the fifth embodiment, AveBandwidth and DurationForAveBandwidth are arranged in the bandwidth segment file. Therefore, the management server 12 and the MPD processing unit 62 need not analyze the MPD file for AveBandwidth and DurationForAveBandwidth.

Sixth Embodiment (First Description Example of MPD File)

A sixth embodiment of an information processing system to which the present disclosure is applied is different from the first embodiment in a configuration of an MPD file and in that a segment length of an audio stream is made variable so that an actual bit rate of a segment file of the audio stream falls within a predetermined range. Therefore, only the configuration of the MPD file and the segment file are hereinafter described.

Figure 20:
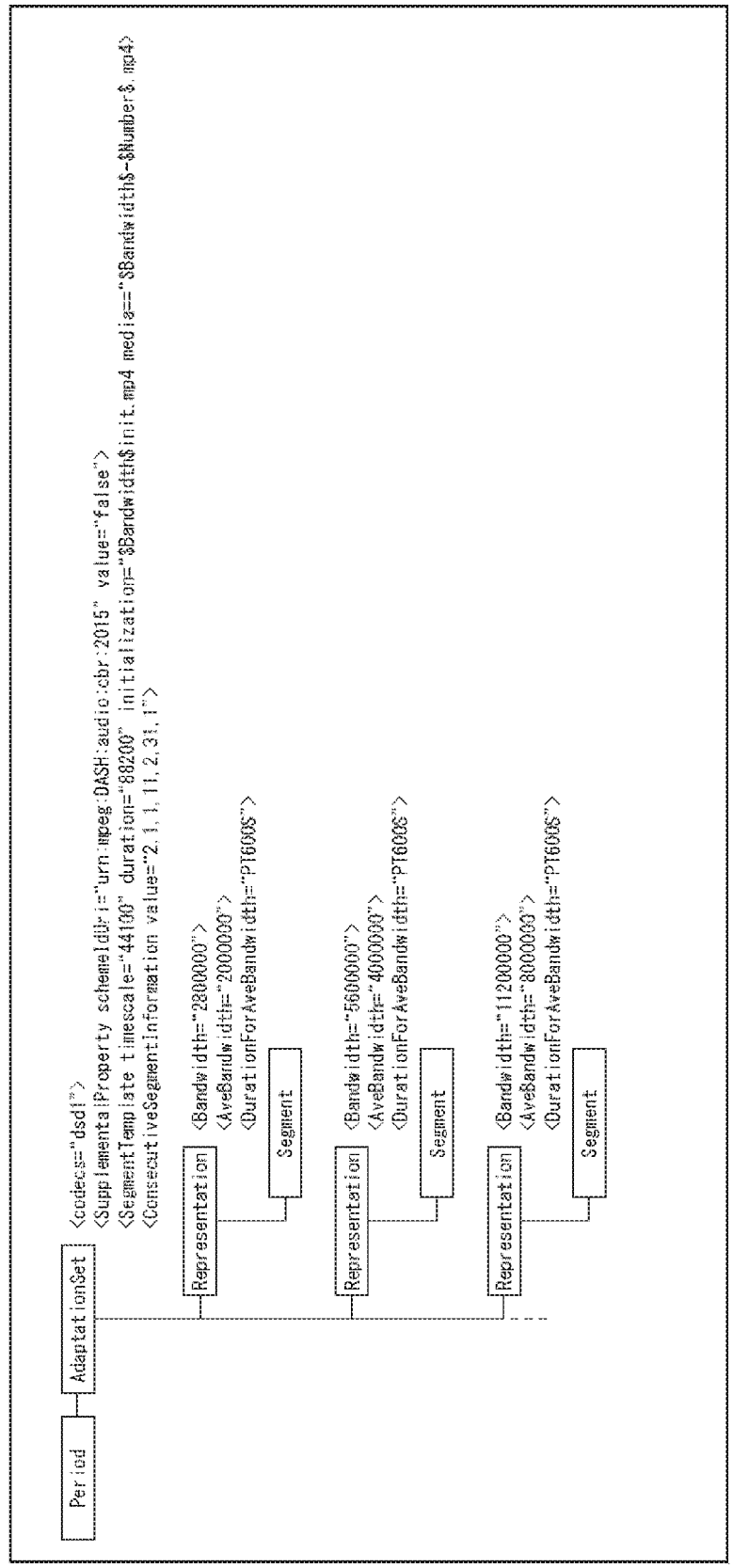
FIG. 20 is a view illustrating a first description example of an MPD file in a sixth embodiment.

FIG. 20 is a view illustrating a first description example of the MPD file in the sixth embodiment.

The description of the MPD file in FIG. 20 is different from the configuration in FIG. 4 in that an adaptation set element of the segment file of the audio stream includes ConsecutiveSegmentInformation indicating the segment length of each segment file.

In the example in FIG. 20, the segment length changes by a positive multiple of a fixed segment length as a reference time. Specifically, the segment file includes concatenation of one or more segment files of the fixed segment length.

Therefore, MaxConsecutiveNumber is described as a value (Value) of ConsecutiveSegmentInformation, and thereafter FirstSegmentNumber and ConsecutiveNumbers are sequentially repeatedly described.

MaxConsecutiveNumber is information indicating the maximum number of concatenation of the segment files of the fixed segment length. The fixed segment length is set on the basis of timescale and duration of Segment Template included in the adaptation set element of the segment file of the audio stream. In the example in FIG. 20, since timescale is 44100 and duration is 88200, the fixed segment length is two seconds.

FirstSegmentNumber is the number from the head of the head segment of a group of consecutive segments of the same length, that is, the number included in the name of the head segment file of a group of consecutive segment files of the same segment length. ConsecutiveNumbers is information indicating how many times of the fixed segment length equals to the segment length of the segment group corresponding to immediately preceding FirstSegmentNumber.

In the example in FIG. 20, the value of ConsecutiveSegmentInformation is set to 2, 1, 1, 11, 2, 31, 1. Therefore, the maximum number of concatenation of the fixed segment length is two. Also, a first media segment file from the head that has a maximum bit rate of 2.8 Mbps and a file name of "2800000-1.mp4" corresponding to the representation element of which Bandwidth is 2800000 is acquired by concatenation of one media segment file having the fixed segment length having the file name of "2800000-1.mp4". Therefore, the segment length of the media segment file the file name of which is "2800000-1.mp4" is two seconds which is one time of the fixed segment length.

Similarly, second to 10th media segment files from the head of which file names are "2800000-2.mp4" to "2800000-10.mp4" are also acquired by concatenation of one media segment file of the fixed segment length having the file names of "2800000-2.mp4" to "2800000-10.mp4", and the segment length of which is two seconds.

Also, an 11th media segment file from the head the file name of which is "2800000-11.mp4" is acquired by concatenation of the media segment files of two fixed segment lengths having the file names of "2800000-11.mp4" and "2800000-12.mp4". Therefore, the segment length of the media segment file the file name of which is "2800000-11.mp4" is four seconds which is twice the fixed segment length. Also, the file name "2800000-12.mp4" of the media segment file concatenated to the media segment file the file name of which is "2800000-11.mp4" is missing.

Similarly, 12th to 19th media segment files from the head the file names of which are "2800000-13.mp4", "2800000-15.mp4", . . . , "2800000-29.mp4" are also acquired by concatenation of two media segment files having the fixed segment length, and the segment length thereof is four seconds.

Furthermore, a 20th media segment file from the head the file name of which is "2800000-31.mp4" is acquired by concatenation of media segment file of one fixed segment length the file name of which is "2800000-31.mp4". Therefore, the segment length of the media segment file the file name of which is "2800000-31.mp4" is two seconds which is one time of the fixed segment length.

Since configurations of the media segment files having the maximum bit rates of 5.6 Mbps and 11.2 Mbps corresponding to the representation elements with Bandwidth of 5600000 and 11200000, respectively, are similar to that of the media segment file with the maximum bit rate of 2.8 Mbps, so that the description thereof is not repeated.

(Second Description Example of MPD File)

Figure 21:
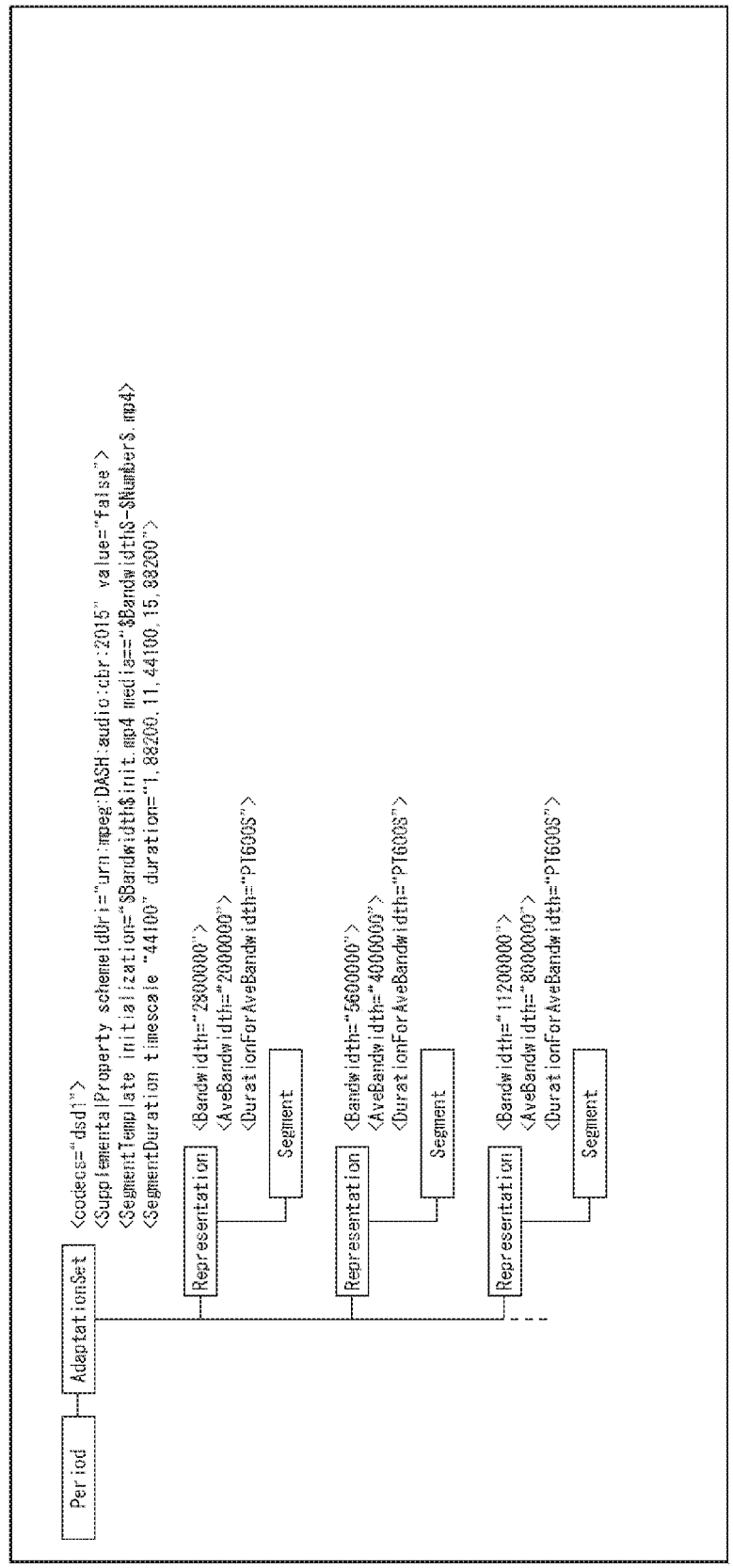
FIG. 21 is a view illustrating a second description example of the MPD file in the sixth embodiment.

FIG. 21 is a view illustrating a second description example of the MPD file in the sixth embodiment.

A configuration of the MPD file in FIG. 21 is different from the configuration in FIG. 4 in that timescale and duration are not described in Segment Template, and that the adaptation set element of the segment file of the audio stream includes SegmentDuration.

In the example in FIG. 21, the segment length changes to arbitrary time. Therefore, timescale and duration are described as SegmentDuration. Being a value indicating one second, timescale is set to 44100 in the example in FIG. 21.

Also, as for duration, FirstSegmentNumber and SegmentDuration are sequentially repeatedly described. FirstSegmentNumber is the same as FirstSegmentNumber in FIG. 20. SegmentDuration is a value of the segment length of a segment group corresponding to immediately preceding FirstSegmentNumber when timescale is set to one second.

In the example in FIG. 21, the value of SegmentDuration is 1,88200, 11,44100, 15,88200. Therefore, the segment length of the first media segment file from the head having the maximum bit rate of 2.8 Mbps and the file name of "2800000-1.mp4" corresponding to the representation element of which Bandwidth is 2800000 is two seconds (=88200/44100). Similarly, the segment length of the second to 10th media segment files the file names of which are "2800000-2.mp4" to "2800000-10.mp4" is also two seconds.

Also, the segment length of the 11th media segment file from the head the file name of which is "2800000-11.mp4" is one second (=44100/44100). Similarly, the segment length of the 12th to 14th media segment files from the head the file names of which are "2800000-12.mp4" to "2800000-14.mp4" is also one second.

Furthermore, the segment length of a 15th media segment file from the head the file name of which is "2800000-15.mp4" is two seconds (=88200/44100).

Configurations of the media segment files having the maximum bit rates of 5.6 Mbps and 11.2 Mbps corresponding to the representation elements with Bandwidth of 5600000 and 11200000, respectively, are similar to that of the media segment file of 2.8 Mbps, so that the description thereof is not repeated.

As described above, in the example in FIG. 21, there is no missing file name of the media segment file of the audio stream.

Meanwhile, in the sixth embodiment, a segment file generation unit 33 determines the segment length such that the bit rate falls within a predetermined range on the basis of the actual bit rate of the audio stream or an average value of the actual bit rates. Therefore, the segment length changes as the audio stream is generated. Therefore, a premium client 17, a quasi-premium client 18, and an on-demand client 19 need to acquire to update the MPD file each time the segment length is changed.

In the sixth embodiment, a change timing of the segment length is supposed to be the same as a calculation timing of the average value of the actual bit rates of the audio stream, but they may be different from each other. In a case where the timings of both are different from each other, information indicating an update interval and update time of the segment length is transmitted to the premium client 17, the quasi-premium client 18, and the on-demand client 19, and the premium client 17, the quasi-premium client 18, and the on-demand client 19 update the MPD file on the basis of the information.

(Configuration Example of Segment File)

FIGS. 22A and 22B are views illustrating a configuration example of the media segment file of the audio stream of a lossless DSD system in the sixth embodiment.

The configuration of the media segment file in FIG. 22A differs from the configuration in FIG. 13 in that Movie fragments as many as not the fixed segment length but the variable segment length are present and that the emsg box is not provided.

Meanwhile, in a case where the media segment file is acquired by concatenation of one or more media segment files of the fixed segment length as in the example in FIG. 20, the media segment file may be acquired by merely concatenating the media segment files of one or more fixed segment lengths as illustrated in FIG. 22B. In this case, there are as many styp boxes and sidx boxes as the number of concatenated media segment files.

As described above, in the sixth embodiment, the segment length of the audio stream is made variable so that the actual bit rate of the segment file of the audio stream falls within a predetermined range. Therefore, even in a case where the actual bit rate of the audio stream is small, the premium client 17, the quasi-premium client 18, and the on-demand client 19 may acquire the audio stream at the bit rate within a predetermined range by acquiring the segment file in units of segments.

On the other hand, in a case where the segment length is fixed, if the actual bit rate of the audio stream is small, a bit amount of the audio stream acquired by acquisition of the segment file of one segment unit decreases. As a result, HTTP overhead per bit amount increases.

Meanwhile, the information indicating the segment length of each segment file may also be transmitted to the premium client 17, the quasi-premium client 18, and the on-demand client 19 in the manner similar to that of AveBandwidth and DurationForAveBandwidth in the third to fifth embodiments. Also, a file indicating the segment length of each segment file may be generated separately from the MPD file and transmitted to the premium client 17, the quasi-premium client 18, and the on-demand client 19.

Furthermore, also in the third to fifth embodiments, the segment length may be made variable as in the sixth embodiment.

<Description of Lossless DSD System>

(Configuration Example of Lossless Compression Encoding Unit)

Figure 23:
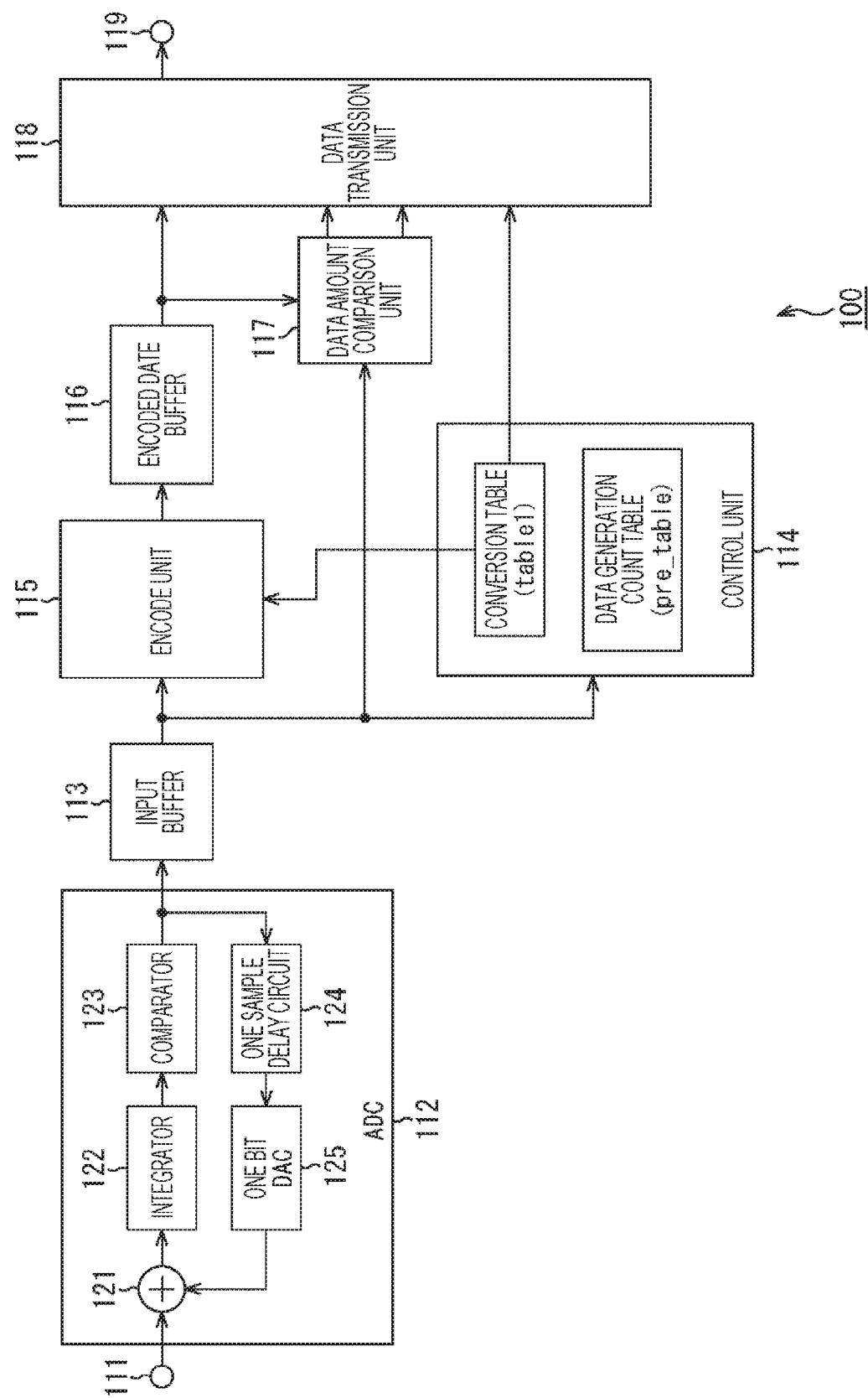
FIG. 23 is a block diagram illustrating a configuration example of a lossless compression encoding unit.

FIG. 23 is a block diagram illustrating a configuration example of a lossless compression encoding unit that A/D converts an audio analog signal and encodes by the lossless DSD system of an acquisition unit 31 and an encoding unit 32 in FIG. 3.

A lossless compression encoding unit 100 in FIG. 23 includes an input unit 111, an ADC 112, an input buffer 113, a control unit 114, an encode unit 115, an encoded data buffer 116, a data amount comparison unit 117, a data transmission unit 118, and an output unit 119. The lossless compression encoding unit 100 converts the audio analog signal into an audio digital signal by the DSD system, and performs the lossless compression encoding on the converted audio digital signal to output.

Specifically, the audio analog signal of the moving image content is input from the input unit 111 and supplied to the ADC 112.

The ADC 112 including an adder 121, an integrator 122, a comparator 123, a one sample delay circuit 124, and a one-bit DAC 125 converts the audio analog signal into the audio digital signal by the DSD system.

That is, the audio analog signal supplied from the input unit 111 is supplied to the adder 121. The adder 121 adds the audio analog signal one sample period before supplied from the one-bit DAC 125 and the audio analog signal from the input unit 111 and outputs the same to the integrator 122.

The integrator 122 integrates the audio analog signal from the adder 121 and outputs the same to the comparator 123. The comparator 123 performs one-bit quantization by comparing an integration value of the audio analog signal supplied from the integrator 122 with midpoint potential in every one sample period.

Meanwhile, it is herein assumed that the comparator 123 performs the one-bit quantization, but this may also perform two-bit quantization, four-bit quantization, or the like. Also, as a frequency (sampling frequency) of the sample period, for example, frequencies 64 times and 128 times of 48 kHz and 44.1 kHz are used. The comparator 123 outputs the one-bit audio digital signal acquired by the one-bit quantization to the input buffer 113 and also supplies the same to the one sample delay circuit 124.

The one sample delay circuit 124 delays the one-bit audio digital signal from the comparator 123 by one sample period and outputs the same to the one-bit DAC 125. The one-bit DAC 125 converts the audio digital signal from the one sample delay circuit 124 into the audio analog signal and outputs the same to the adder 121.

The input buffer 113 temporarily stores the one-bit audio digital signal supplied from the ADC 112 and supplies the same to the control unit 114, the encode unit 115, and the data amount comparison unit 117 on a frame-by-frame basis. Herein, one frame is a unit to section the audio digital signal into a predetermined time (period) to regard one group.

The control unit 114 controls operation of an entire lossless compression encoding unit 100. Also, the control unit 114 has a function of creating a conversion table table1 required for the encode unit 115 to perform the lossless compression encoding and supplying the same to the encode unit 115.

Specifically, the control unit 114 creates a data generation count table pre_table in a frame unit using the audio digital signal of one frame supplied from the input buffer 113, and further creates the conversion table table1 from the data generation count table pre_table. The control unit 114 supplies the conversion table table1 created in a frame unit to the encode unit 115 and the data transmission unit 118.

Using the conversion table table1 supplied from the control unit 114, the encode unit 115 performs the lossless compression encoding on the audio digital signal supplied from the input buffer 113 in units of four bits. Therefore, the audio digital signal is supplied from the input buffer 113 to the encode unit 115 simultaneously with the timing at which this is supplied to the control unit 114, but in the encode unit 115, processing stands by until the conversion table table1 is supplied from the control unit 114.

Although the lossless compression encoding is described later in detail, the encode unit 115 performs the lossless compression encoding of a four-bit audio digital signal into a two-bit audio digital signal or into a six-bit audio digital signal and outputs the same to the encoded data buffer 116.

The encoded data buffer 116 temporarily buffers the audio digital signal generated as a result of the lossless compression encoding by the encode unit 115 and supplies the same to the data amount comparison unit 117 and the data transmission unit 118.

The data amount comparison unit 117 compares the data amount of the audio digital signal on which the lossless compression encoding is not performed supplied from the input buffer 113 with the data amount of the audio digital signal on which the lossless compression encoding is performed supplied from the encoded data buffer 116 in a frame unit.

That is, as described above, since the encode unit 115 performs the lossless compression encoding on the four-bit audio digital signal into the two-bit audio digital signal or six-bit audio digital signal, there is a case where the data amount of the audio digital signal after the lossless compression encoding exceeds the data amount of the audio digital signal before the lossless compression encoding in algorithm. Therefore, the data amount comparison unit 117 compares the data amount of the audio digital signal after the lossless compression encoding with the data amount of the audio digital signal before the lossless compression encoding.

Then, the data amount comparison unit 117 selects one with the smaller data amount and supplies selection control data indicating which one is selected to the data transmission unit 118. Meanwhile, in a case of supplying the selection control data indicating that the audio digital signal before the lossless compression encoding is selected to the data transmission unit 118, the data amount comparison unit 117 also supplies the audio digital signal before the lossless compression encoding to the data transmission unit 118.

The data transmission unit 118 selects either the audio digital signal supplied from the encoded data buffer 116 or the audio digital signal supplied from the data amount comparison unit 117 on the basis of the selection control data supplied from the data amount comparison unit 117. In a case of selecting the audio digital signal on which the lossless compression encoding is performed supplied from the encoded data buffer 116, the data transmission unit 118 generates the audio stream from the audio digital signal, the selection control data, and the conversion table table1 supplied from the control unit 114. On the other hand, in a case where the data transmission unit 118 selects the audio digital signal on which the lossless compression encoding is not performed supplied from the data amount comparison unit 117, this generates the audio stream from the audio digital signal and the selection control data. Then, the data transmission unit 118 outputs the generated audio stream via the output unit 119. Meanwhile, the data transmission unit 118 may also generate the audio stream by adding a synchronization signal and an error correction code (ECC) to the audio digital signal for each predetermined number of samples.

(Example of Data Generation Count Table)

FIG. 24 is a view illustrating an example of the data generation count table generated by the control unit 114 in FIG. 23.

The control unit 114 divides the audio digital signal in a frame unit supplied from the input buffer 113 in units of four bits. Hereinafter, an ith (i is an integer larger than 1) audio digital signal in the four-bit unit from the head which is divided is referred to as D4 data D4[i].

For each frame, the control unit 114 sequentially makes an nth (n>3) D4 data D4[n] from the head the D4 data to be processed. For each pattern of three most recent past D4 data D4[n−3], D4[n−2], and D4[n−1] of the D4 data D4[n] to be processed, the control unit 114 counts the number of times of generation of the D4 data D4[n] to be processed, and creates a data generation count table pre_table[4096][16] illustrated in FIG. 24. Herein, [4096] and [16] of the data generation count table pre_table[4096][16] indicate that the data generation count table is a table (matrix) of 4096 rows and 16 columns, and each row from [0] to [4095] corresponds to a value which the past three D4 data D4[n−3], D4[n−2], and D4[n−1] may take, and each column from [0] to [15] corresponds to a value which the D4 data D4[n] to be processed may take.

Specifically, pre_table[0][0] to [0][15] being a first row of the data generation count table pre_table indicates the number of times of generation of the D4 data D4[n] to be processed when the past three D4 data D4[n−3], D4[n−2], and D4[n−1] is "0"={0000, 0000, 0000}. In the example in FIG. 24, the number of times that the past three D4 data D4[n−3], D4[n−2], and D4[n−1] are "0" and the D4 data D4[n] to be processed is "0" is 369a (HEX notation), and the number of times that the past three D4 data D4[n−3], D4[n−2], and D4[n−1] are "0" and the D4 data D4[n] to be processed is other than "0" is 0. Therefore, pre_table [0][0] to [0][15] is expressed as {369a, 0,0,0,0,0,0,0,0,0,0,0,0,0,0,0}.

The number of times of generation of the D4 data D4[n] to be processed when the past three D4 data D4[n−3], D4[n−2], and D4[n−1] is "1"={0000, 0000, 0001} is indicated by pre_table [1][0] to [1][15] being a second row of the data generation count table pre_table. In the example in FIG. 24, there is no pattern within one frame in which past three D4 data D4[n−3], D4[n−2], and D4[n−1] are "1". Therefore, pre_table [1][0] to [1][15] is expressed as {0,0,0,0,0,0,0,0,0,0,0,0,0,0,0,0}.

Also, pre_table [117][0] to [117][15] being a 118th row of the data generation count table pre_table indicate the number of times of generation of the D4 data D4[n] to be processed when the past three D4 data D4[n−3], D4[n−2], and D4[n−1] is "117"={0000, 0111, 0101}. In the example in FIG. 24, it is indicated that the number of times that the past three D4 data D4[n−3], D4[n−2], and D4[n−1] is "117" and the D4 data D4[n] to be processed is "0", "1", "2", "3", "4", "5", "6", "7", "8", "9", "10", and "11" to "15" is 0, 1, 10, 18, 20, 31, 11, 0, 4, 12, 5, and 0, respectively. Therefore, the pre_table [117][0] to [117][15] is {0,1,10,18,20,31,11,0,4,12,5,0,0,0,0,0}.

(Example of Conversion Table)

FIG. 25 is a view illustrating an example of the conversion table table1 generated by the control unit 114 in FIG. 23.

The control unit 114 creates a conversion table table1 [4096][3] of 4096 rows and three columns on the basis of the data generation count table pre_table created earlier. Herein, each of the rows [0] to [4095] of the conversion table table1[4096][3] corresponds to a value which the past three D4 data D4[n−3], D4[n−2], and D4[n−1] may take, and in columns [0] to [2], three values with a high generation frequency among 16 values that the D4 data D4[n] to be processed may take are stored. In a first column [0] of the conversion table table1[4096][3], a value having highest (first) generation frequency is stored, in a second column [1], a value having a second generation frequency is stored, and in a third column [2], a value having a third generation frequency is stored.

Specifically, in a case where the control unit 114 generates the conversion table table1[4096][3] on the basis of the data generation count table pre_table in FIG. 24, as illustrated in FIG. 25, table1[117][0] to [117][2] being a 118th row of the conversion table table1[4096][3] becomes {05, 04, 03}. That is, in the pre_table[117][0] to [117][15] in the 118th row of the data generation count table pre_table in FIG. 24, the value with the highest (first) generation frequency is "5" generated 31 times, the value with the second generation frequency is "4" generated 20 times, and the value with the third generation frequency is "3" generated 18 times. Therefore, {05} is stored in 118th row first column table1[117][0] of the conversion table table1[4096][3], {04} is stored in 118th row second column table1[117][1], and {03} is stored in 118th row third column table1[117][2].

Similarly, table1[0][0] to [0][2] of the first row of the conversion table table1[4096][3] are generated on the basis of pre_table[0][0] to [0][15] of the first row of the data generation count table pre_table in FIG. 24. That is, in pre_table[0][0] to [0][15] of the first row of the data generation count table pre_table in FIG. 24, a value with a highest (first) generation frequency is "0" generated 369a (HEX notation) times and no other value is generated. Therefore, {00} is stored in first row first column table1[0][0] of the conversion table table1[4096][3], and {ff} indicating that no data is present is stored in first row second column table1[0][1] and first row third column table1[0][2]. A value indicating that no data is present is not limited to {ff}, and this may be determined as appropriate. Since the value stored in each element of the conversion table table1 is any one of "0" to "15", this may be represented by four bits, but in terms of computer processing, this is represented by eight bits for ease of handling.

(Description of Lossless Compression Encoding)

Next, a compression encoding method using the conversion table table1 by the encode unit 115 in FIG. 23 is described.

As is the case with the control unit 114, the encode unit 115 divides the audio digital signal in a frame unit supplied from the input buffer 113 in a unit of four bits. In a case of the lossless compression encoding of nth D4 data D4[n] from the head, the control unit 114 searches three values of a row corresponding to most recent past three D4 data D4[n−3], D4[n−2], and D4[n−1] of the conversion table table1[4096][3]. The encode unit 115 generates a two-bit value "01b" as a result of the lossless compression encoding of the D4 data D4[n] in a case where the D4 data D4[n] subjected to the lossless compression encoding is the same as a value of a first column of the row corresponding to most recent past three D4 data D4[n−3], D4[n−2], and D4[n−1] of the conversion table table1[4096][3]. In addition, the encode unit 115 generates a two-bit value "10b" as a result of the lossless compression encoding of the D4 data D4[n] in a case where the D4 data D4[n] subjected to the lossless compression encoding is the same as a value of a second column of the row corresponding to the most recent past three D4 data D4[n−3], D4[n−2], and D4[n−1] of the conversion table1[4096][3], and generate a two-bit value "11b" as a result of the lossless compression encoding of the D4 data D4[n] in a case where this is the same as the value in the third column.

On the other hand, the encode unit 115 generates a six-bit value "00b+D4[n]" acquired by adding "00b" before the D4 data D4[n] as a result of the lossless compression encoding of the D4 data D4[n] in a case where the value the same as the D4 data D4[n] subjected to the lossless compression encoding is not present in the three values of the row corresponding to the most recent past three D4 data D4[n−3], D4[n−2], and D4[n−1] of the conversion table table1[4096][3] Herein, b in "01b", "10b", "11b", and "00b+D4[n]" indicates that this is in binary notation.

As described above, the encode unit 115 converts the four-bit DSD data D4[n] into the two-bit values "01b", "10b", or "11", or converts into the six-bit value "00b+D4[n]" using the conversion table table1 to make the lossless compression encoding result. The encode unit 115 outputs the lossless compression encoding result to the encoded data buffer 116 as the audio digital signal subjected to the lossless compression encoding.

(Configuration Example of Lossless Compression Decoding Unit)

Figure 26:
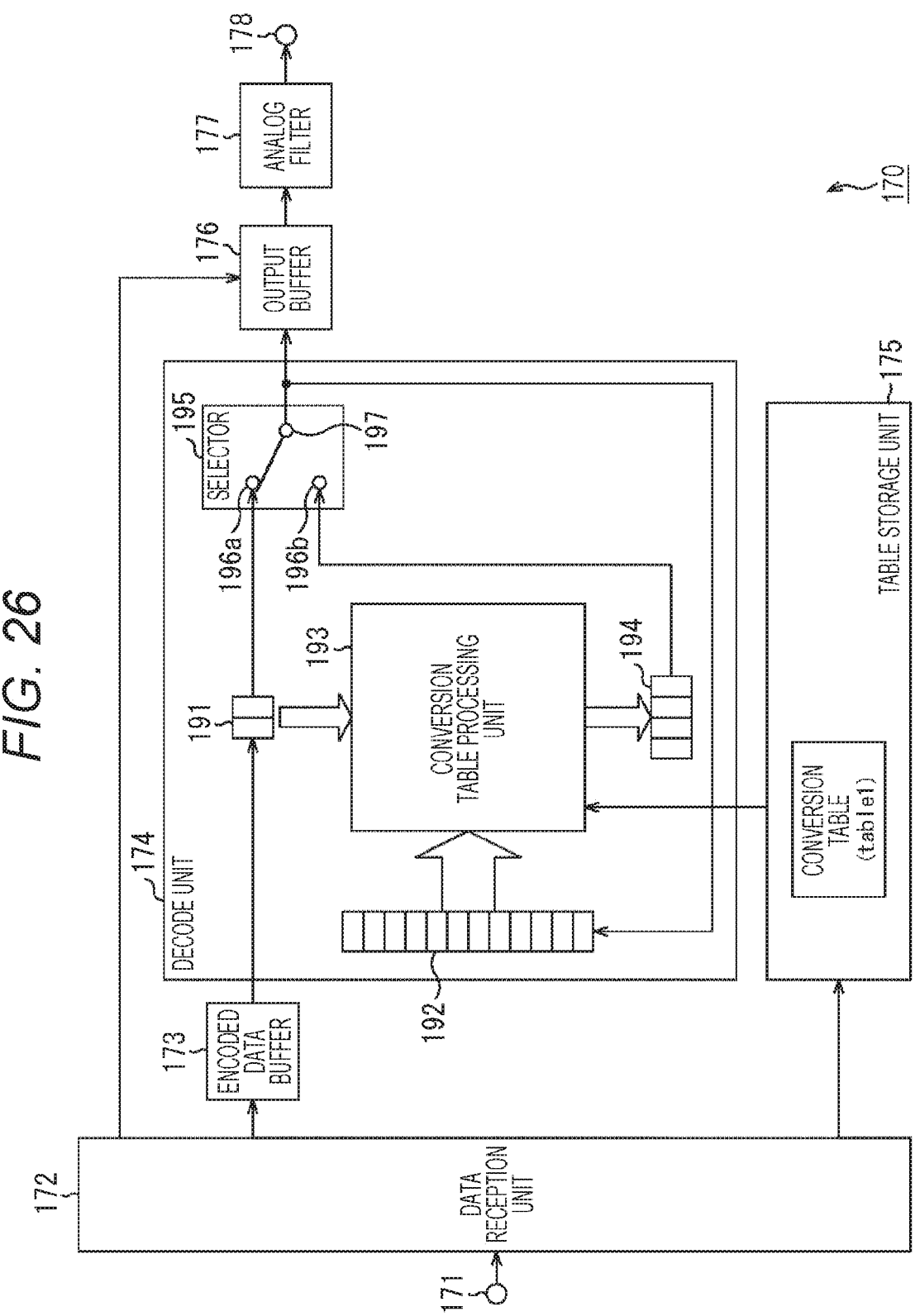
FIG. 26 is a block diagram illustrating a configuration example of a lossless compression decoding unit.
Figure 27:
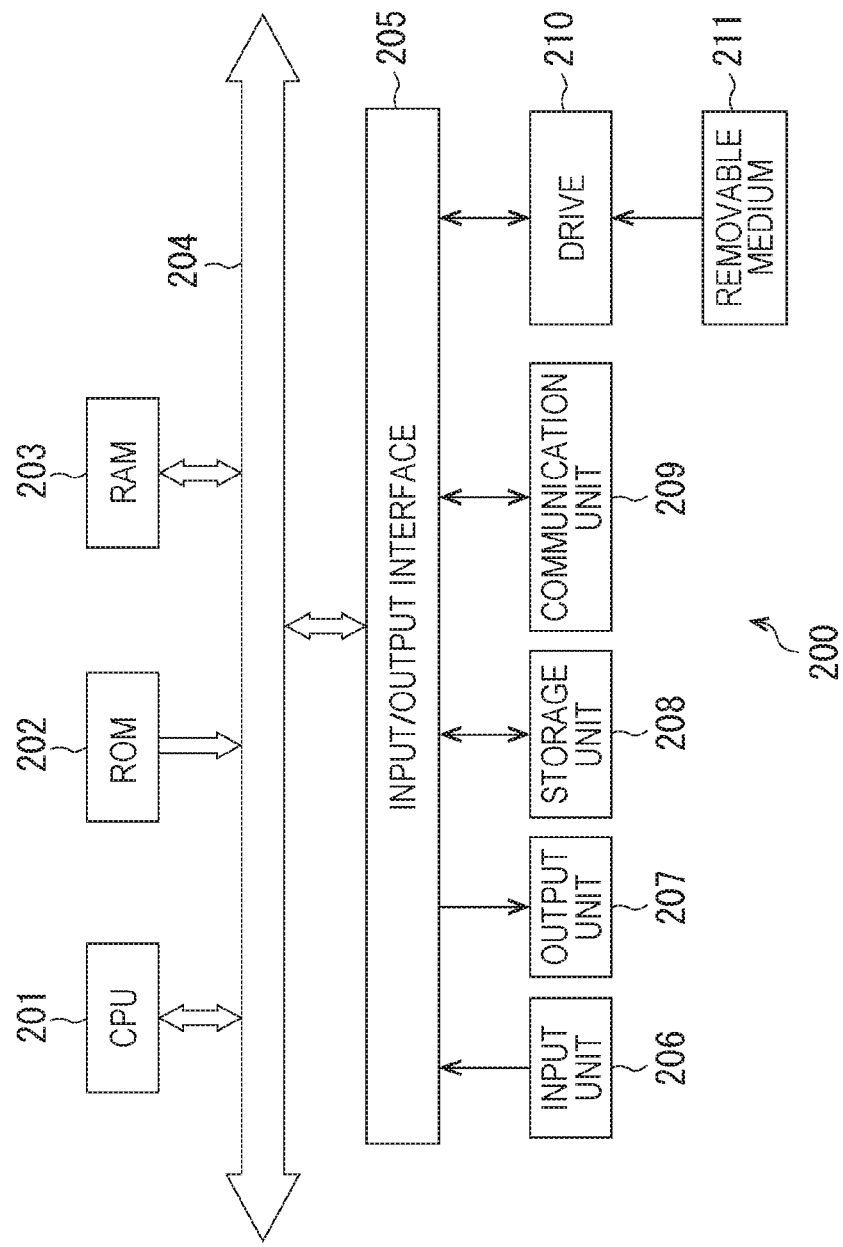
FIG. 27 is a block diagram illustrating a configuration example of hardware of a computer.

FIG. 26 is a block diagram illustrating a configuration example of a lossless compression decoding unit which decodes the audio stream by the lossless DSD system and performs D/A conversion out of a decoding unit 66 and an output control unit 67 in FIG. 6.

A lossless compression decoding unit 170 in FIG. 26 includes an input unit 171, a data reception unit 172, an encoded data buffer 173, a decode unit 174, a table storage unit 175, an output buffer 176, an analog filter 177, and an output unit 178. The lossless compression decoding unit 170 performs the lossless compression decoding on the audio stream by the lossless DSD system and converts the audio digital signal obtained as a result to the audio analog signal in the DSD system to output.

Specifically, the audio stream supplied from a buffer 65 in FIG. 6 is input from the input unit 171 and supplied to the data reception unit 172.

The data reception unit 172 determines whether or not the audio digital signal is subjected to the lossless compression encoding on the basis of the selection control data indicating whether or not the audio digital signal included in the audio stream is subjected to the lossless compression encoding. Then, in a case where it is determined that the audio digital signal is subjected to the lossless compression encoding, the data reception unit 172 supplies the audio digital signal included in the audio stream to the encoded data buffer 173 as the audio digital signal subjected to the lossless compression encoding. Also, the data reception unit 172 supplies the conversion table table1 included in the audio stream to the table storage unit 175.

On the other hand, in a case where it is determined that the audio signal is not subjected to the lossless compression encoding, the data reception unit 172 supplies the audio digital signal included in the audio stream to the output buffer 176 as the audio digital signal not subjected to the lossless compression encoding.

The table storage unit 175 stores the conversion table table1 supplied from the data reception unit 172 and supplies the same to the decode unit 174.

The encoded data buffer 173 temporarily accumulates the audio digital signal subjected to the lossless compression encoding supplied from the data reception unit 172 in frame units. The encoded data buffer 173 supplies the accumulated audio digital signals in a frame unit to the decode unit 174 on a subsequent stage by two consecutive bits at a predetermined timing.

The decode unit 174 includes a two-bit register 191, a 12-bit register 192, a conversion table processing unit 193, a four-bit register 194, and a selector 195. The decode unit 174 performs lossless compression decoding on the audio digital signal subjected to the lossless compression encoding to generate the audio digital signal before the lossless compression encoding.

Specifically, the register 191 stores the two-bit audio digital signal supplied from the encoded data buffer 173. The register 191 supplies the stored two-bit audio digital signal to the conversion table processing unit 193 and the selector 195 at a predetermined timing.

The 12-bit register 192 stores 12 bits of the four-bit audio digital signals which is a result of the lossless compression decoding supplied from the selector 195 by first-in first-out (FIFO). As a result, the register 192 stores the D4 data which is most recent past three results of the lossless compression decoding of the results of the lossless compression decoding of the audio digital signal including the two-bit audio digital signal stored in the register 191.

In a case where the two-bit audio digital signal supplied from the register 191 is "00b", the conversion table processing unit 193 ignores the audio digital signal because this is not registered in the conversion table table1[4096][3]. In addition, the conversion table processing unit 193 ignores a total of four bits of audio digital signals of twice supplied immediately after the two-bit audio digital signal currently supplied.

On the other hand, in a case where the supplied two-bit audio digital signal is "01b", "10b", or "11b", the conversion table processing unit 193 reads the three D4 data (12 bits of D4 data) stored in the register 192. The conversion table processing unit 193 reads the D4 data stored in the column indicated by the supplied two-bit audio digital signal of the row in which the three read D4 data are registered as $D4[n-3]$, $D4[n-2]$, and $D4[n-1]$ of the conversion table table1 from the table storage unit 175. The conversion table processing unit 193 supplies the read D4 data to the register 194.

The register 194 stores the four-bit D4 data supplied from the conversion table processing unit 193. The register 194 supplies the stored four-bit D4 data to an input terminal 196b of the selector 195 at a predetermined timing.

The selector 195 selects the input terminal 196a in a case where the two-bit audio digital signal supplied from the register 191 is "00b". Then, the selector 195 outputs the four-bit audio digital signal input after "00b" to the input terminal 196a as a result of the lossless compression decoding from the output terminal 197 to the register 192 and the output buffer 176.

On the other hand, in a case where the four-bit audio digital signal is input from the register 194 to the input terminal 196b, the selector 195 selects the input terminal 196b. Then, the selector 195 outputs the four-bit audio digital signal input to the input terminal 196b as a result of the lossless compression decoding from the output terminal 197 to the register 192 and the output buffer 176.

The output buffer 176 stores the audio digital signal not subjected to the lossless compression encoding supplied from the data reception unit 172 or the audio digital signal that is a result of the lossless compression decoding supplied from the decode unit 174 and supplies the same to the analog filter 177.

The analog filter 177 executes a predetermined filtering process such as a low-pass filter and a band-pass filter on the audio digital signal supplied from the output buffer 176 and outputs the same via the output unit 178.

Meanwhile, the conversion table table1 may also be compressed by the lossless compression encoding unit 100 and supplied to the lossless compression decoding unit 170. Also, the conversion table table1 may be set in advance and stored in the lossless compression encoding unit 100 and the lossless compression decoding unit 170. Furthermore, there may be a plurality of conversion tables table1. In this case, in a jth (j is an integer not smaller than 0) conversion table table1, $3(j-1)$th, $3(j-1)+1$st, and $3(j-1)+2$nd D4 data are stored in each row in descending order of generation frequency. Also, the number of past D4 data corresponding to each row is not limited to three.

Also, the lossless compression encoding method is not limited to the above-described method, and may be, for example, the method disclosed in Japanese Patent Application Laid-Open No. H9-74358.

Seventh Embodiment (Description of Computer to which Present Disclosure is Applied)

A series of processes described above may be executed by hardware or by software. In a case where a series of processes is performed by the software, a program which forms the software is installed on a computer. Herein, the computer includes a computer built in dedicated hardware, a general-purpose personal computer, for example, capable of executing various functions by various programs installed and the like.

FIG. 27 is a block diagram illustrating a configuration example of hardware of a computer which executes the above-described series of processes by a program.

In a computer 200, a central processing unit (CPU) 201, a read only memory (ROM) 202, and a random-access memory (RAM) 203 are connected to one another by a bus 204.

An input/output interface 205 is further connected to the bus 204. An input unit 206, an output unit 207, a storage unit 208, a communication unit 209, and a drive 210 are connected to the input/output interface 205.

The input unit 206 includes a keyboard, a mouse, a microphone and the like. The output unit 207 includes a display, a speaker and the like. The storage unit 208 includes a hard disk, a non-volatile memory and the like. The communication unit 209 includes a network interface and the like. The drive 210 drives a removable medium 211 such as a magnetic disk, an optical disk, a magnetooptical disk, or a semiconductor memory.

In the computer 200 configured in the above-described manner, the CPU 201 loads the program stored in the storage unit 208, for example, on the RAM 203 via the input/output interface 205 and the bus 204 to execute, so that a series of processes described above is performed.

The program executed by the computer 200 (CPU 201) may be recorded on the removable medium 211 as a package medium and the like to be provided, for example. Also, the program may be provided by means of a wired or wireless transmission medium such as a local region network, the Internet, and digital broadcasting.

In the computer 200, the program may be installed on the storage unit 208 via the input/output interface 205 by mounting the removable medium 211 on the drive 210. Also, the program may be received by the communication unit 209 via the wired or wireless transmission medium to be installed on the storage unit 208. In addition, the program may be installed in advance on the ROM 202 and the storage unit 208.

Note that the program executed by the computer 200 may be the program of which processes are performed in time series in the order described in this specification or may be the program of which processes are performed in parallel or at required timing such as when a call is issued.

Also, in this specification, a system is intended to mean assembly of a plurality of components (devices, modules (parts) and the like) and it does not matter whether or not all the components are in the same casing. Therefore, a plurality of devices stored in different casings connected through the network and one device realized by storing a plurality of modules in one casing are the systems.

Furthermore, the effect described in this specification is illustrative only and is not limitative; there may also be another effect.

Also, the embodiment of the present disclosure is not limited to the above-described embodiments and various modifications may be made without departing from the gist of the present disclosure.

For example, the scaling may be performed not only on the premium server 14, the quasi-premium server 15, and the on-demand server 16 but also on the management server 12 and the original distribution server 13. Also, the original distribution server 13 may analyze not the bit rate information and the maximum bit rate transmitted from the management server 12 separately from the MPD file and the segment file but the MPD file and the segment file transmitted from the management server 12 and performs the scaling.

Also, the lossless DSD system in the first to seventh embodiments may be other than the lossless DSD system as long as this is the lossless compression system in which the bit generation amount by lossless compression encoding cannot be predicted. For example, the lossless DSD system in the first to seventh embodiments may be free lossless audio codec (FLAC) system, Apple lossless audio codec (ALAC) system and the like. In the FLAC system and the ALAC system also, as in the lossless DSD system, the bit generation amount varies according to the waveform of the audio analog signal. Meanwhile, a variable ratio differs depending on the system.

Furthermore, in the sixth embodiment, a segment file having a fixed segment length may be generated when generating the segment file. In this case, the premium server 14, the quasi-premium server 15, and the on-demand server 16 generate to distribute a segment file of a variable segment length by concatenating the segment file of the fixed segment length on the basis of AveBandwidth at the time of distribution.

Also, in the third to fifth embodiments, (updated values of) AveBandwidth and DurationForAveBandwidth are arranged in the segment file. Therefore, the quasi-premium client 18 and the on-demand client 19 cannot acquire latest AveBandwidth and DurationForAveBandwidth when the reproduction is started. Therefore, when transmitting the segment file storing (the updated values of) AveBandwidth and DurationForAveBandwidth, latest AveBandwidth and DurationForAveBandwidth may be stored again. In this case, the quasi-premium client 18 and the on-demand client 19 may recognize latest AveBandwidth and DurationForAveBandwidth when the reproduction is started.

Also, in the first to seventh embodiments, only latest AveBandwidth and DurationForAveBandwidth are described in the MPD file or the segment file, but AveBandwidth and DurationForAveBandwidth at arbitrary time may be enumerated. In this case, the premium client 17, the quasi-premium client 18, and the on-demand client 19 may perform fine bandwidth control. Meanwhile, in a case where an arbitrary time is a fixed time, it is possible that only one DurationForAveBandwidth is described.

Meanwhile, the present disclosure may also have the following configurations.

(1) An information processing device provided with:
a scaling unit which performs scaling of a distribution device which distributes an audio stream to other information processing device on the basis of bit rate information including an average value of a predetermined period of bit rates of the audio stream encoded by a lossless compression system.

(2) The information processing device according to above-described (1),
in which the scaling unit performs the scaling on the basis of the number of other information processing devices which request to distribute the audio stream and distribution start time of the audio stream to the other information processing devices.

(3) The information processing device according to above-described (1) or (2),
in which the distribution device permits the distribution of the audio stream when generation of the audio stream is started according to a fee of charging processing to the other information processing device.

(4) The information processing device according to any one of above-described (1) to (3),
in which the distribution device permits the distribution of the audio stream after a lapse of a predetermined time after generation of the audio stream is started according to a fee of charging processing to the other information processing device.

(5) The information processing device according to any one of (1) to (4),
in which the distribution device permits the distribution of the audio stream after generation of the audio stream is finished according to a fee of charging processing to the other information processing device.

(6) The information processing device according to any one of above-described (1) to (5),
in which the bit rate information includes the predetermined period.

(7) The information processing device according to any one of above-described (1) to (6),
in which the predetermined period increases by a reference period for each reference period, and the bit rate information is updated for each reference period.

(8) The information processing device according to above-described (7),
in which the bit rate information is included in a management file which manages the audio stream.

(9) The information processing device according to above-described (8),
in which the management file includes information indicating the reference period.

(10) The information processing device according to above-described (7),
in which an initial value of the bit rate information is included in a management file which manages the audio stream, and
an updated value of the bit rate information is included in a file which stores the audio stream.

(11) The information processing device according to above-described (7),
in which the bit rate information is included in a file which stores the audio stream.

(12)

The information processing device according to above-described (7), in which the bit rate information is included in a file different from a file which stores the audio stream and managed by a management file which manages the audio stream.

(13)

The information processing device according to any one of above-described (1) to (12), in which the lossless compression system is a lossless direct stream digital (DSD) system, a free lossless audio codec (FLAC) system, or an Apple lossless audio codec (ALAC) system.

(14)

An information processing method provided with:

a scaling step of an information processing device of performing scaling of a distribution device which distributes an audio stream to other information processing device on the basis of bit rate information including an average value of a predetermined period of bit rates of the audio stream encoded by a lossless compression system.

(15)

An information processing system provided with:

a first information processing device;

a second information processing device; and a distribution device, in which the first information processing device performs scaling of the distribution device which distributes an audio stream to the second information processing device on the basis of bit rate information including an average value of a predetermined period of bit rates of the audio stream encoded by a lossless compression system.

(16)

The information processing system according to above-described (15), further provided with:

a charging processing device which performs processing of charging the second information processing device, in which the distribution device distributes the audio stream according to a fee of the charging processing by the charging processing device.

(17)

The information processing system according to above-described (16), in which the distribution device permits the distribution of the audio stream when generation of the audio stream is started according to the fee of the charging processing.

(18)

The information processing system according to above-described (16) or (17), in which the distribution device permits the distribution of the audio stream after a lapse of a predetermined time after the generation of the audio stream is started according to the fee of the charging processing.

(19)

The information processing system according to any one of above-described (16) to (18), in which the distribution device permits the distribution of the audio stream after the generation of the audio stream is finished according to the fee of the charging processing.

REFERENCE SIGNS LIST

10 Information processing system
13 Original distribution server
14 Premium server
15 Quasi-premium server
17 Premium client
18 Quasi-premium client
21 Charging server

The invention claimed is:

1. An information processing device, comprising:
a scaling unit which scales a first distribution device which distributes content to other first information processing device on the basis of bit rate information of a predetermined period of the content,
wherein the first distribution device distributes the content after a lapse of a predetermined time after generation of the content is started.

2. The information processing device according to claim 1,
wherein the scaling unit performs the scaling on the basis of a number of first information processing devices which request to distribute the content and distribution start time of the content to the first information processing devices.

3. The information processing device according to claim 1,
wherein the scaling unit further performs scaling of a second distribution device which distributes the content to other second information processing device, and
the second distribution device distributes the content when the generation of the content starts according to a fee of processing of charging the other second information processing device.

4. The information processing device according to claim 1,
wherein the first distribution device distributes the content after the lapse of the predetermined time after the generation of the content is started according to a fee of processing of charging the other first information processing device.

5. The information processing device according to claim 1,
wherein the scaling unit further performs scaling of a third distribution device which distributes the content to other third information processing device, and
the third distribution device distributes the content after the generation of the content is finished according to a fee of processing of charging the other third information processing device.

6. The information processing device according to claim 1,
wherein the content is an audio stream encoded by a lossless compression system, and
the bit rate information includes an average value of bit rates in the predetermined period of the audio stream.

7. The information processing device according to claim 1,
wherein the bit rate information includes information indicating the predetermined period.

8. The information processing device according to claim 1,
wherein the predetermined period increases by a reference period for each reference period, and the bit rate information is updated for each reference period.

9. The information processing device according to claim 8,
wherein the bit rate information is included in a management file which manages the content.

10. The information processing device according to claim 9,
wherein the management file includes information indicating the reference period.

11. The information processing device according to claim 8,
wherein an initial value of the bit rate information is included in a management file which manages the content, and an updated value of the bit rate information is included in a file which stores the content.

12. The information processing device according to claim 8,
wherein the bit rate information is included in a file which stores the content.

13. The information processing device according to claim 8,
wherein the bit rate information is included in a file different from a file which stores the content and managed by a management file which manages the content.

14. The information processing device according to claim 6,
wherein the lossless compression system is a lossless direct stream digital (DSD) system, a free lossless audio codec (FLAC) system, or an Apple lossless audio codec (ALAC) system.

15. An information processing method, comprising:
a scaling step of an information processing device of performing scaling of a distribution device which distributes content to other information processing device on the basis of bit rate information of a predetermined period of the content,
wherein the distribution device distributes the content after a lapse of a predetermined time after generation of the content is started.

16. An information processing system, comprising:
a first information processing device;
a second information processing device; and
a first distribution device,
wherein the first information processing device performs scaling of the first distribution device which distributes content to the second information processing device on the basis of bit rate information of a predetermined period of the content, and the first distribution device distributes the content after a lapse of a predetermined time after generation of the content is started.

17. The information processing system according to claim 16, further comprising:
a charging processing device which performs processing of charging the second information processing device,
wherein the first distribution device distributes the content according to a fee of the charging processing by the charging processing device.

18. The information processing system according to claim 17, further comprising:
a second distribution device,
wherein the second distribution device distributes the content when the generation of the content is started according to the fee of the charging processing.

19. The information processing system according to claim 17,
wherein the first distribution device distributes the content after the lapse of the predetermined time after the generation of the content is started according to the fee of the charging processing.

20. The information processing system according to claim 17, further comprising:
a third distribution device,
wherein the third distribution device distributes the content when the generation of the content is finished according to the fee of the charging processing.

* * * * *